United States Patent
Fukaya et al.

(10) Patent No.: US 11,230,320 B2
(45) Date of Patent: Jan. 25, 2022

(54) DRIVING ASSISTANCE DEVICE

(71) Applicant: DENSO CORPORATION, Kariya (JP)

(72) Inventors: Naoki Fukaya, Kariya (JP); Hiroto Uesaka, Kariya (JP); Toshihira Katsu, Kariya (JP); Shinji Kawamura, Kariya (JP); Yoshiki Ohzawa, Kariya (JP); Akihito Tanahashi, Kariya (JP); Nozomi Kawase, Kariya (JP); Waka Sengoku, Kariya (JP)

(73) Assignee: DENSO CORPORATION, Kariya (JP)

( * ) Notice: Subject to any disclaimer, the term of this patent is extended or adjusted under 35 U.S.C. 154(b) by 305 days.

(21) Appl. No.: 16/575,841

(22) Filed: Sep. 19, 2019

(65) Prior Publication Data

US 2020/0010118 A1    Jan. 9, 2020

Related U.S. Application Data

(63) Continuation of application No. PCT/JP2018/005627, filed on Feb. 19, 2018.

(30) Foreign Application Priority Data

| Mar. 21, 2017 | (JP) | JP2017-054771 |
| Dec. 27, 2017 | (JP) | JP2017-252523 |
| Dec. 27, 2017 | (JP) | JP2017-252524 |
| Dec. 27, 2017 | (JP) | JP2017-252525 |
| Dec. 27, 2017 | (JP) | JP2017-252526 |

(51) Int. Cl.
*B62D 15/02* (2006.01)
*B62D 6/00* (2006.01)
*B62D 12/00* (2006.01)

(52) U.S. Cl.
CPC ....... *B62D 15/0265* (2013.01); *B62D 15/029* (2013.01)

(58) Field of Classification Search
CPC .......................... B62D 15/0265; B62D 15/029
(Continued)

(56) References Cited

U.S. PATENT DOCUMENTS

| 2015/0183465 | A1* | 7/2015 | Lee | B62D 15/0265 |
| | | | | 701/41 |
| 2017/0153645 | A1 | 6/2017 | Aoyagi | |
| 2017/0320433 | A1* | 11/2017 | Zhang | G01S 15/931 |

FOREIGN PATENT DOCUMENTS

| JP | 2010-250542 A | 11/2010 |
| JP | 2015-083430 A | 4/2015 |

(Continued)

*Primary Examiner* — B M M Hannan
(74) *Attorney, Agent, or Firm* — Maschoff Brennan

(57) ABSTRACT

A driving assistance device acquires a surrounding area map, determines whether a subject vehicle is travelable in an assistance target scene based on the surrounding area map, generates a guide that guides the subject vehicle in the assistance target scene based on the surrounding area map, adjusts relative positions of an obstacle and the guide in the surrounding area map in accordance a reference position information, perform a steering assistance to assist steering of the subject vehicle in accordance with the guide when determines that the subject vehicle is travelable, and updates the reference position information in accordance with a degree of deviation between the guide and an actual trajectory along which the subject vehicle passes during the steering assistance.

10 Claims, 19 Drawing Sheets

(58) Field of Classification Search
USPC .......................................................... 701/41
See application file for complete search history.

(56) References Cited

FOREIGN PATENT DOCUMENTS

| | | |
|---|---|---|
| JP | 2017-019435 A | 1/2017 |
| JP | 2017-077829 A | 4/2017 |
| JP | 2017-097695 A | 6/2017 |

* cited by examiner

DRIVING ASSISTANCE DEVICE

CROSS REFERENCE TO RELATED APPLICATIONS

The present application is a continuation application of International Patent Application No. PCT/JP2018/005627 filed on Feb. 19, 2018, which designated the U.S. and claims the benefit of priority from Japanese Patent Application No. 2017-054771 filed on Mar. 21, 2017, Japanese Patent Application No. 2017-252523 filed on Dec. 27, 2017, Japanese Patent Application No. 2017-252524 filed on Dec. 27, 2017, Japanese Patent Application No. 2017-252525 filed on Dec. 27, 2017, and Japanese Patent Application No. 2017-252526 filed on Dec. 27, 2017. The entire disclosures of all of the above applications are incorporated herein by reference.

TECHNICAL FIELD

The present disclosure relates to a driving assistance device.

BACKGROUND

Some vehicles are equipped with driving assistance devices for assisting driving of drivers in the respective vehicles.

SUMMARY

The present disclosure provides a driving assistance device that acquires a surrounding area map, determines whether a subject vehicle is travelable in an assistance target scene based on the surrounding area map, generates a guide that guides the subject vehicle in the assistance target scene based on the surrounding area map, adjusts relative positions of an obstacle and the guide in the surrounding area map in accordance a reference position information, perform a steering assistance to assist steering of the subject vehicle in accordance with the guide when determines that the subject vehicle is travelable, and updates the reference position information in accordance with a degree of deviation between the guide and an actual trajectory along which the subject vehicle passes during the steering assistance.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
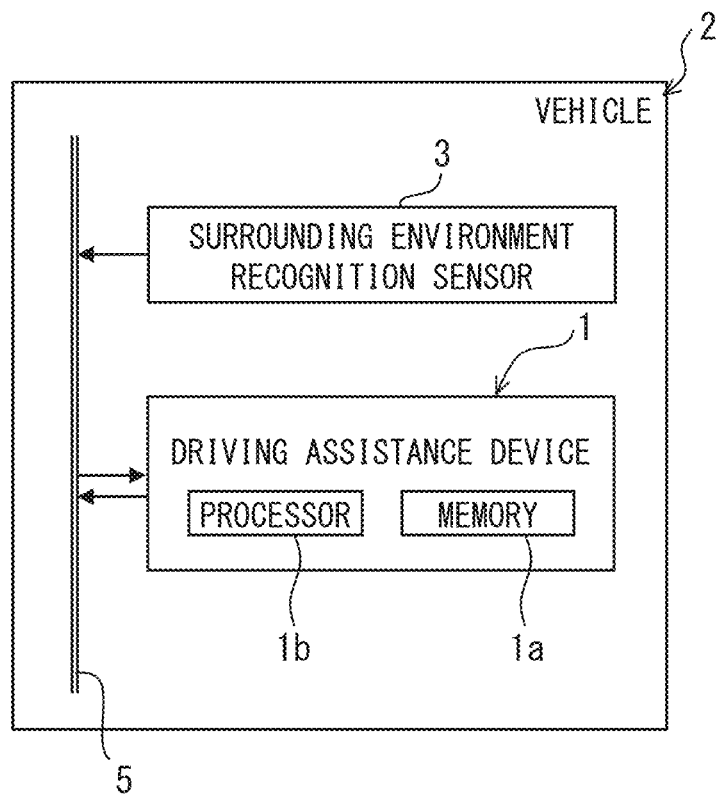
FIG. 1 is a block diagram showing a driving assistance device according to a first embodiment of the present disclosure.
Figure 2:
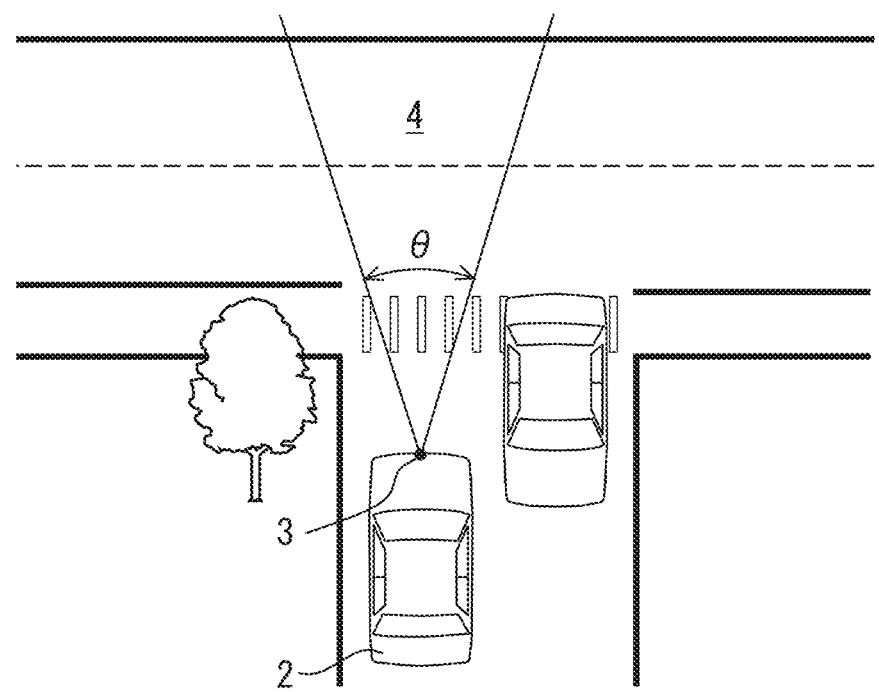
FIG. 2 is a schematic view for explaining a surrounding environment recognition sensor of the driving assistance device according to the first embodiment.

In recent years, due to a relatively large number of restrictions for making driving assistance devices function well, drivers may not fully utilize functions of the driving assistance devices well. Further, among drivers who drive on a daily basis, there are some drivers who have awareness that they are not good at driving subject vehicles or have some experiences of fear.

In a scene of passing through a space beside another vehicle waiting for a right turn or a left turn, or in a scene of passing each other with another vehicle coming in the opposite direction on a road with a small width or a narrow road, if a driver does not move a subject vehicle forward even though there is an interval enough for the passing through or the passing each other, the subject vehicle may cause trouble to other vehicles. In another case, in those scenes, if the driver moves the subject vehicle forward even though the interval is not enough for the passing through or the passing each other, the subject vehicle may collide with the other vehicle.

In a scene of passing through a space beside another vehicle on a narrow road or in a scene of passing each other with another vehicle coming in the opposite direction on a narrow road, if the subject vehicle cannot be moved toward one side because the driver cannot grasp a position of a side object such as a utility pole, a guardrail, a curbstone, a side wall, a pedestrian, a bicycle, or a motorcycle and a position of a roadside edge such as a road shoulder or a sidewalk, the passing-through or the passing-each-other might not be possible. In another case, in those scenes, if the subject vehicle is moved toward one side excessively because the driver cannot grasp a position of a side groove on the road shoulder that is the roadside edge or the position of the side object, the subject vehicle might step off from the road shoulder to the side groove or cause contact with the side object.

In a scene of passing through a space while avoiding a fallen object on a road or a parked or stopped vehicle, or in a scene of passing-each-other with another vehicle coming in the opposite direction while avoiding such an object or vehicle, if the driver fails to perform steering necessary for the avoidance due to overlooking or insufficient recognition of a vehicle width, the subject vehicle might collide with the fallen object or the parked or stopped vehicle. In another case, particularly in the passing-each-other scene of those scenes, when the vehicle width is not sufficiently recognized and the steering for the avoidance is performed more than necessary, the other vehicle might be in trouble.

In a related art, for the passing-through scene of these scenes, a target steering angle for guiding the subject vehicle is set so that the subject vehicle passes through a target passing point beside an obstacle to pass through. However, the target passing point is a predetermined position that is set by just considering a width of the subject vehicle, and hence a size of a space ensured between the subject vehicle and the obstacle might cause a difference from a sense of the driver. This is because, even when a physically passable region for the subject vehicle is ensured beside the obstacle, the sense of whether the passing-through or the passing-each other is allowable in accordance with the size of the space between the subject vehicle and the obstacle varies for each driver. Therefore, the difference in the sense makes the driver feel uneasy.

A driving assistance device according to a first aspect of the present disclosure is configured to assist driving of a driver in a subject vehicle and includes a map acquisition unit, a traveling determination unit, a guide generation unit, a steering assistance unit, and a reference updating unit. The map acquisition unit is configured to acquire a surrounding area map that indicates an object state in a surrounding area of the subject vehicle to define a positional relation between objects. The traveling determination unit is configured to determine, based on the surrounding area map acquired by the map acquisition unit, whether the subject vehicle is travelable in an assistance target scene that is at least one of a passing-through scene and a passing-each-other scene. The guide generation unit is configured to generate a guide that guides the subject vehicle in the assistance target scene based on the surrounding area map acquired by the map acquisition unit and configured to adjust relative positions of an obstacle to the subject vehicle in the assistance target scene and the guide in the surrounding area map in accordance a reference position information. The steering assistance unit is configured to perform a steering assistance to assist steering of the subject vehicle by the driver in accordance with the guide generated by the guide generation unit when the traveling determination unit determines that the subject vehicle is travelable. The reference updating unit is configured to update the reference position information in accordance with a degree of deviation between the guide generated by the guide generation unit and an actual trajectory along which the subject vehicle passes during the steering assistance by the steering assistance unit.

Please note that, in the present disclosure, "at least one of the passing-through scene and the passing-each-other scene" means the passing-though scene, the passing-each-other scene, or both the passing-through scene and the passing-each-other scene.

A driving assistance device according to a second aspect of the present disclosure is configured to assist driving of a driver in a subject vehicle and includes a processor and a memory storing a program. The program causes the processor to: acquire a surrounding area map that indicates an object state in a surrounding area of the subject vehicle to define a positional relation between objects; determine, based on the surrounding area map, whether the subject vehicle is travelable in an assistance target scene that is at least one of a passing-through scene and a passing-each-other scene; generate a guide that guides the subject vehicle in the assistance target scene based on the surrounding area map and adjust relative positions of an obstacle to the subject vehicle in the assistance target scene and the guide in the surrounding area map in accordance a reference position information; perform a steering assistance to assist steering of the subject vehicle by the driver in accordance with the guide when determines that the subject vehicle is travelable; and update the reference position information in accordance with a degree of deviation between the guide and an actual trajectory along which the subject vehicle passes during the steering assistance.

According to the first and second aspects of the present disclosure, in the assistance target scene that is at least one of the passing through scene and the passing-each-other scene, it is possible to assist the driver with the traveling and steering of the subject vehicle. Specifically, by acquiring the surrounding area map that indicates the object state in the surrounding area of the subject vehicle to define the positional relation between the objects, a region in the area where the subject vehicle can travel is recognized with high accuracy. Therefore, whether the subject vehicle is travelable in the assistance target scene can be accurately determined based on the surrounding area map. Further, when it is determined that the subject vehicle is travelable, the steering of the subject vehicle by the driver can be accurately assisted by following the guide that is generated based on the surrounding area map as a guide for guiding in the assistance target scene. According to the above, it is possible to ensure the safety and security of the driver in at least one of the passing-through scene and the passing-each-other scene as the assistance target scene.

In addition, according to the first and second aspects of the present disclosure, the relative positions of the obstacle to the subject vehicle in the assistance target scene and the guide in the surrounding area map are adjusted in accordance with predetermined reference position information. Here, when the reference position information is updated in accordance with the degree of deviation from the guide of the actual trajectory along which the subject vehicle has passed during the steering assistance, the size of the space ensured by the subject vehicle between the subject vehicle and the obstacle in accordance with the guide can be approximated to the size in the actual trajectory on which the sense of the driver has been reflected. It is thus possible to enhance the sense of security given to the driver in at least one of the passing-through scene and the passing-each-other scene as the assistance target scene.

Hereinafter, embodiments of the present disclosure will be described with reference to the drawings. Concerning the corresponding constituent in each embodiment, a redundant description may be omitted. When only a part of the configuration is described in each embodiment, the configuration of another embodiment described in advance may be applied to the other part of the configuration. Not only the configurations can be combined as specified in the description of each embodiment, but also configurations of a plurality of embodiments can be partially combined even if not specified so long as the combination causes no problem. The combination of the configurations described in a plurality of embodiments and modifications, which is not explicitly described, is taken as disclosed by the following description.

First Embodiment

A driving assistance device 1 shown in FIG. 1 in a first embodiment of the present disclosure is applied to a vehicle 2 to assist driving of a driver. Hereinafter, the vehicle 2 to which the driving assistance device 1 is applied will be referred to as the subject vehicle 2.

A surrounding environment recognition sensor 3 is mounted in the subject vehicle 2 so as to be able to recognize a surrounding environment. The surrounding environment recognition sensor 3 detects the state of an object present in a surrounding area 4 of the subject vehicle 2 as shown in FIGS. 2 to 5 within a detection range determined by a viewing angle θ. Here, the object state detected by the surrounding environment recognition sensor 3 is, for example, at least one of a distance, an orientation, a position including the distance and the orientation, and a size of the object in the surrounding area 4. Therefore, as the surrounding environment recognition sensor 3, at least one of a lidar (also referred to as laser radar), a camera (e.g., stereo camera), and a radio wave radar (e.g., millimeter wave radar) may be mounted in the subject vehicle 2.

As shown in FIG. 1, the driving assistance device 1 mounted in the subject vehicle 2 is formed of at least one electronic control unit (ECU) mainly composed of a microcomputer. The driving assistance device 1 combines the detection information of the surrounding environment recognition sensor 3 described above with vehicle-related information such as a vehicle speed and a steering angle processed on an in-vehicle network 5 such as a controller area network (CAN, registered trademark), to acquire a surrounding area map 6 indicating the object state in the surrounding area 4 as shown on the right side of each of FIGS. 3 to 5. That is, the surrounding area map 6 is acquired as two-dimensional or three-dimensional mapping data indicating at least one of the distance, the orientation, the position including the distance and the orientation, and the size of an object present in the surrounding area 4. Hence, the surrounding area map 6 defines the positional relation among various objects with the subject vehicle 2 at the center (i.e., the origin of 0 m and 0° in the surrounding area map of each of FIGS. 3 to 5). Here, in particular, when the installation position of the surrounding environment recognition sensor 3 in the subject vehicle 2 is grasped in advance, it is possible to predictably calculate a planned trajectory of the outermost edge of the subject vehicle 2 accompanying the movement in the surrounding area map 6, so that the relative positional relation with the object centering on the subject vehicle 2 can be defined accurately. Therefore, based on the surrounding area map 6, the driving assistance device 1 can accurately identify a region in the surrounding area 4 where the subject vehicle 2 can travel and a region in the surrounding area 4 where the subject vehicle 2 cannot travel.

Figure 3:
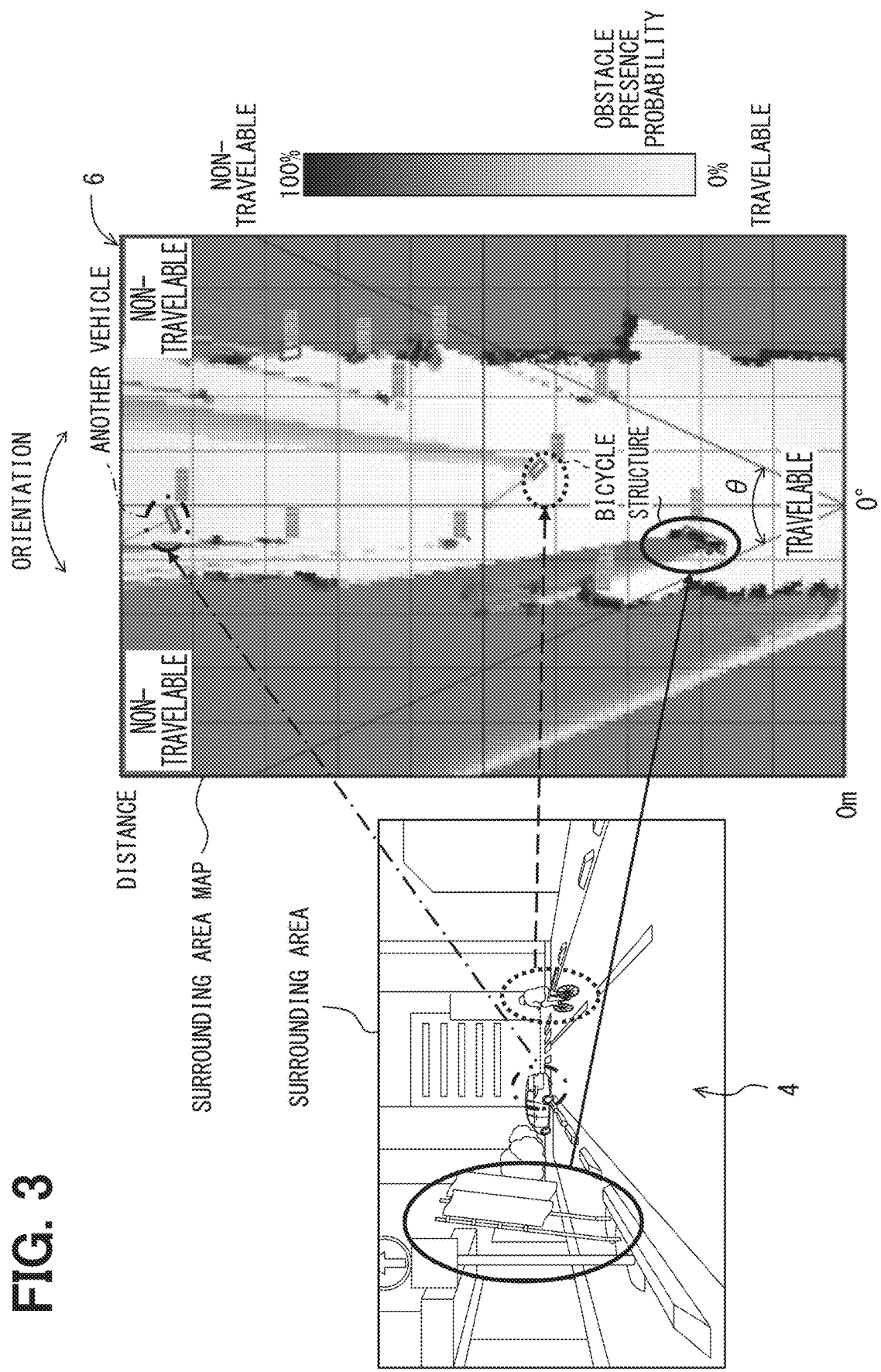
FIG. 3 is a schematic view for explaining a surrounding area and a surrounding area map according to the first embodiment.
Figure 4:
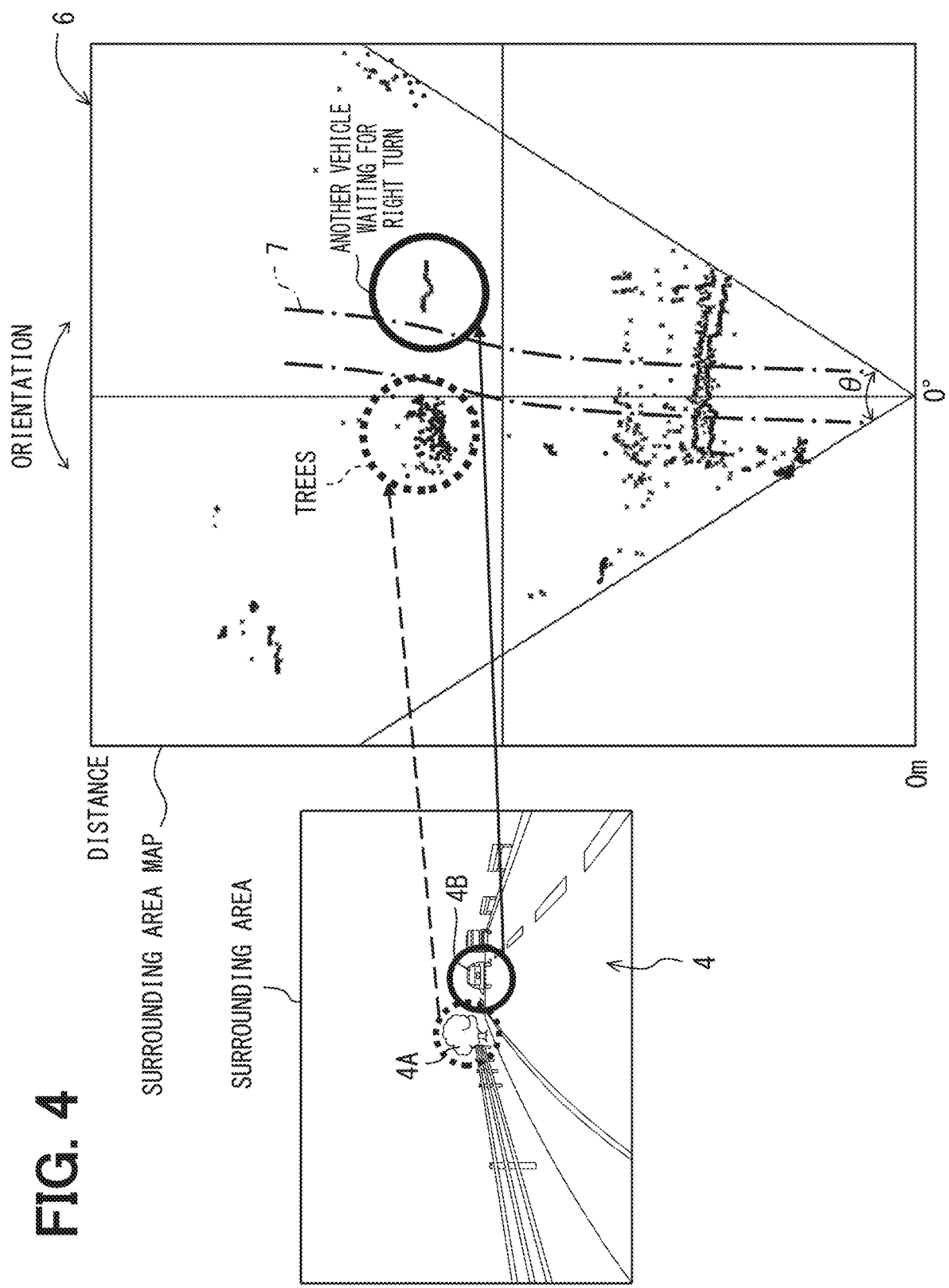
FIG. 4 is a schematic view for explaining a surrounding area and a surrounding area map according to the first embodiment.
Figure 5:
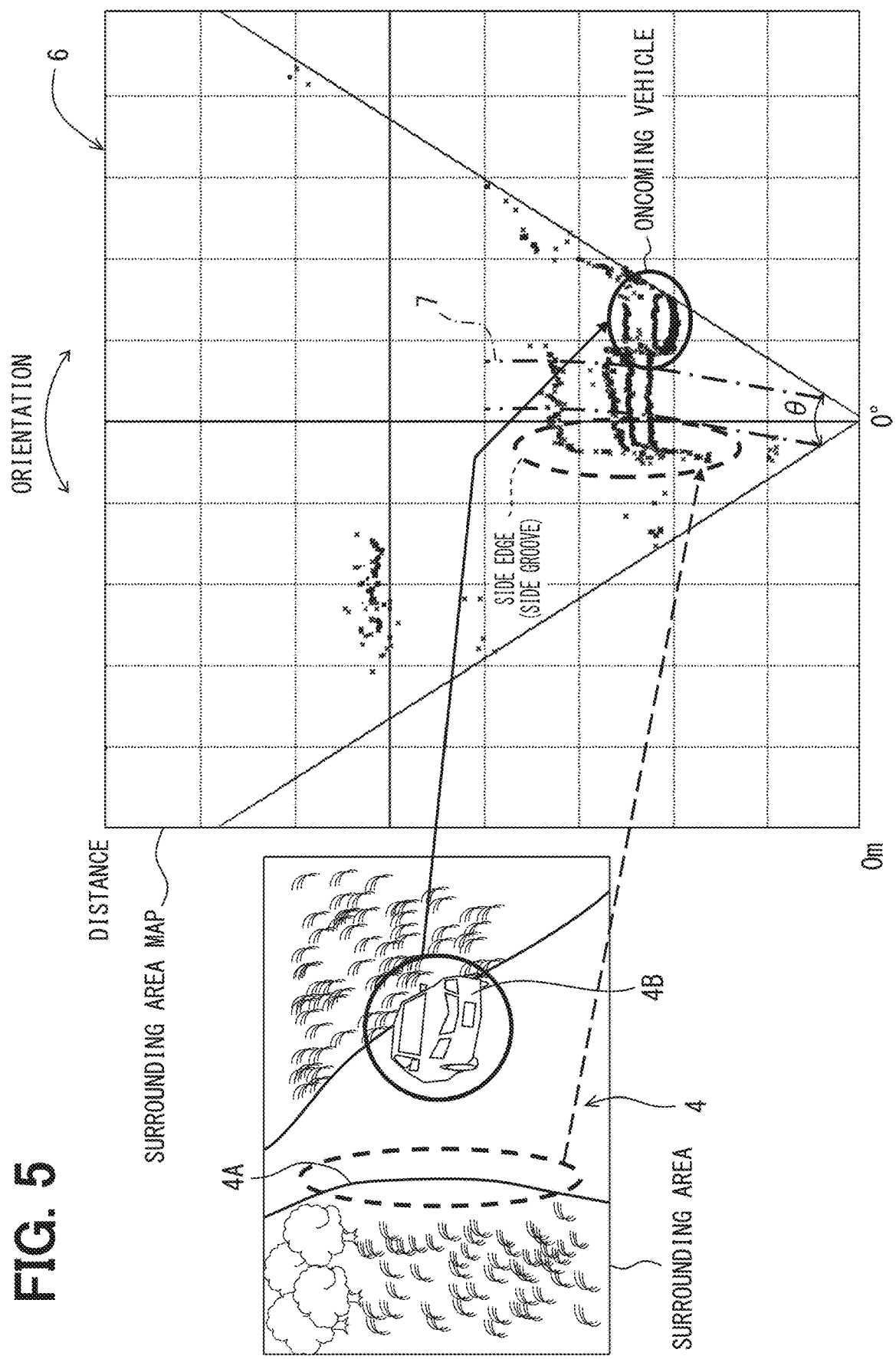
FIG. 5 is a schematic view for explaining a surrounding area and a surrounding area map according to the first embodiment.
Figure 6:
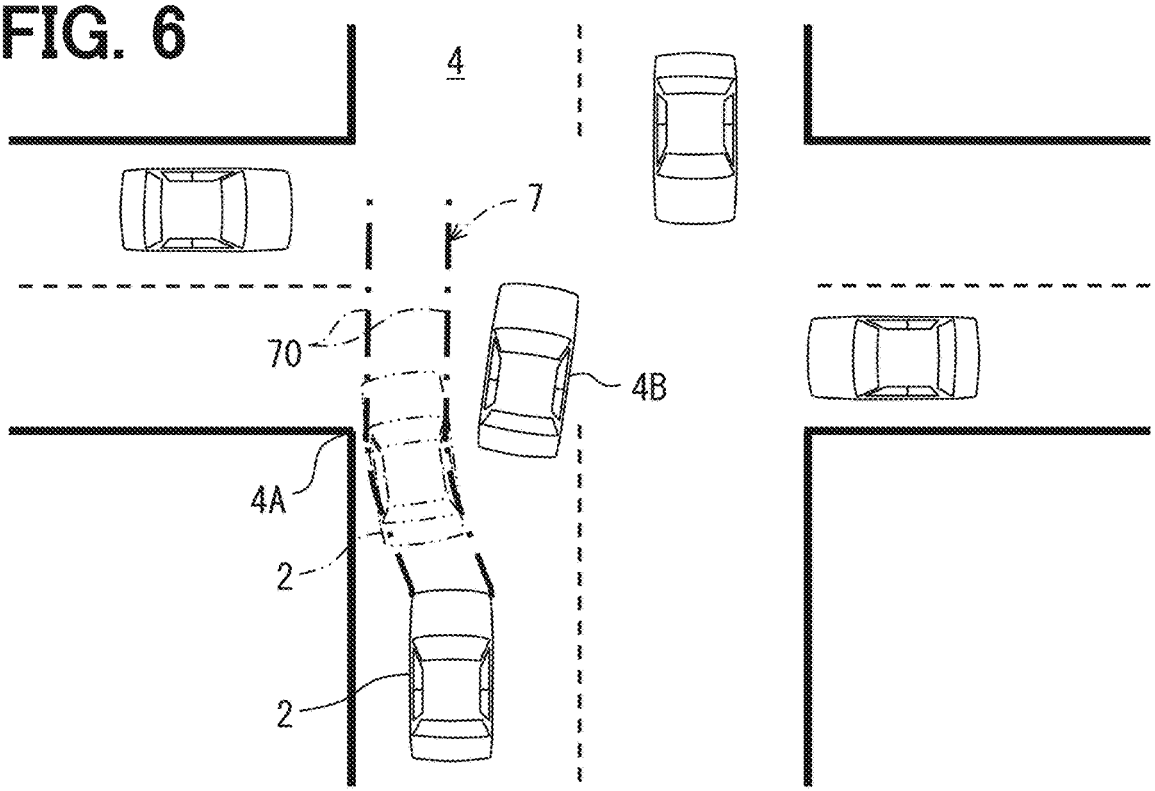
FIG. 6 is a schematic view for explaining the operation of the driving assistance device according to the first embodiment.
Figure 7:
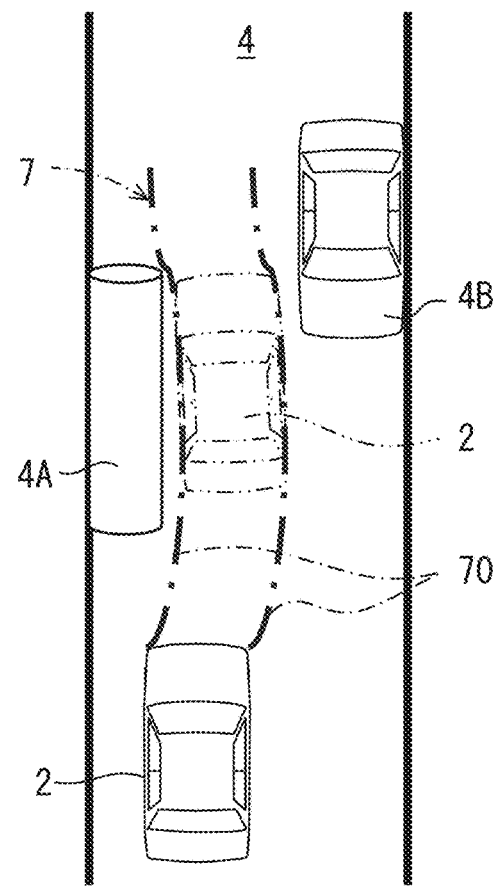
FIG. 7 is a schematic view for explaining the operation of the driving assistance device according to the first embodiment.

In the surrounding area map of FIG. 3, the region where the subject vehicle 2 is travelable due to a low presence probability of an object to be an obstacle is illustrated in white, whereas the region where the subject vehicle 2 is non-travelable due to a high presence probability of an object is illustrated in gray to black. However, in the surrounding area maps of FIGS. 4 and 5, the illustration of an non-travelable region is omitted except for locations where obstacles (4A, 4B described later) are present in contrast with a travelable region that is illustrated in the same manner as in the surrounding area map of FIG. 3.

There is a concern that when the obstacles 4A, 4B to the subject vehicle 2 are present respectively at the left front side and the right front side of the surrounding area 4 as shown in FIGS. 4 to 9 and an interval D (refer to FIGS. 8 and 9) therebetween is relatively narrow, the driver of the subject vehicle 2 may be unable to promptly decide whether the passing-through or the passing-each-other of the subject vehicle 2 is possible. In addition, there is a concern that even when the interval D where the passing-through or the passing-each-other is possible can be ensured, the driver of the subject vehicle 2 may be unable to promptly decide how to perform steering for making the subject vehicle 2 safely travelable. Such an impossibility of prompt decision by the driver occurs, for example, in a scene of passing through a space beside another vehicle waiting for a right turn as in FIGS. 4 and 6 or in a passing-through scene or a passing-each-other scene on a road with a small width or a narrow road as in FIGS. 5 and 7 to 9. Here, the interval D means not only a direct clearance between the obstacles 4A, 4B in the vehicle width direction of the subject vehicle 2 (i.e., the right-left direction or the lateral direction) but also a clearance in the vehicle width direction between virtual lines extended forward and backward from the obstacles 4A, 4B along the vehicle length direction of the subject vehicle 2 (i.e., the front-back direction).

For dealing with the concern described above, the driving assistance device 1 determines whether the subject vehicle 2 is travelable based on the presence or absence of the interval D where the passing-through or the passing-each-other is possible from the relative positional relation between the subject vehicle 2 and the obstacles 4A, 4B in accordance with a driving assistance flow utilizing the surrounding area map 6, to achieve driving assistance that enables safe passing-through or passing-each-other. Here, "whether the subject vehicle is travelable" means whether the passing-through or the passing-each-other is possible for the subject vehicle 2 without coming into contact with or colliding with the obstacles 4A, 4B to pass through or pass each other.

Figure 10:
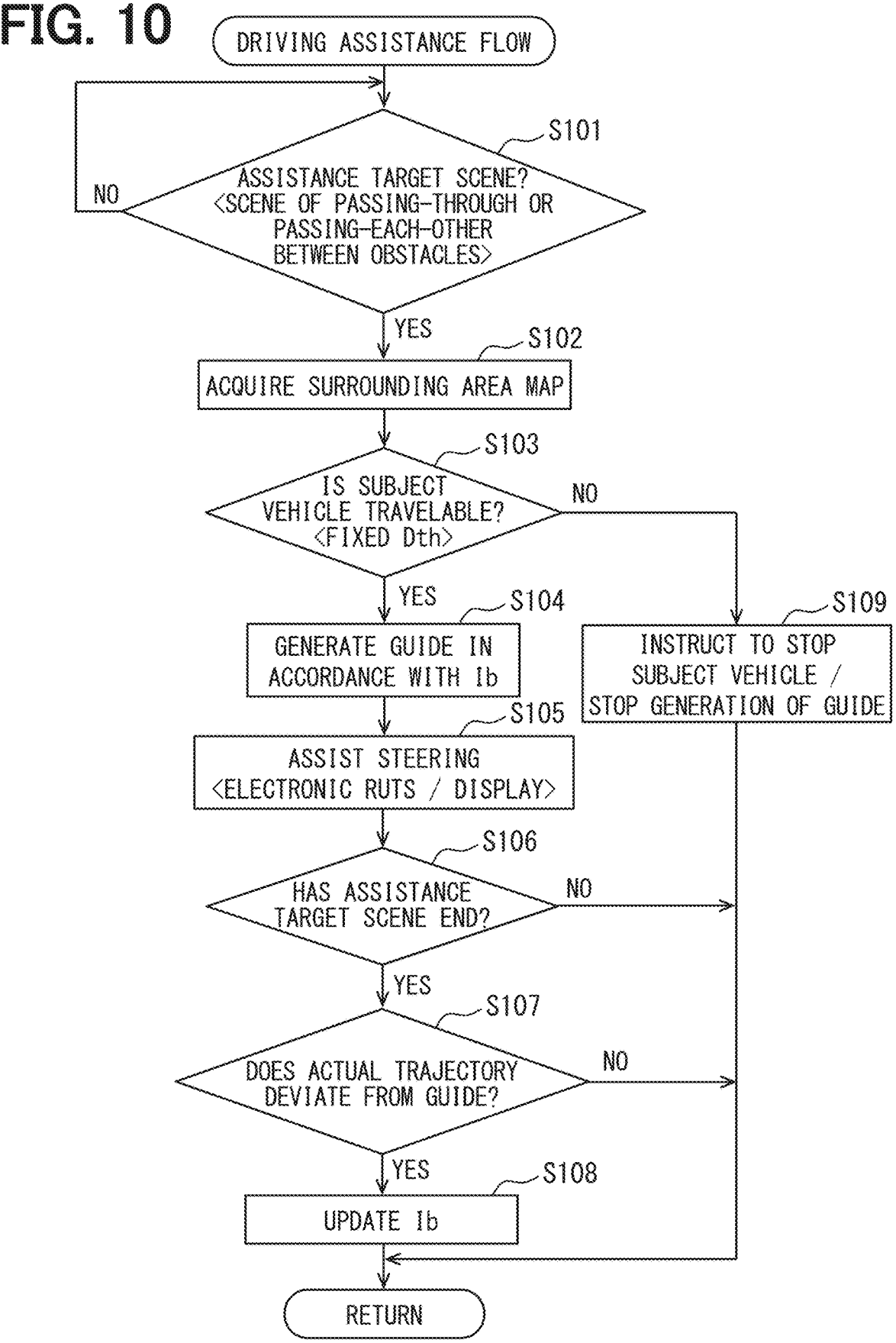
FIG. 10 is a flowchart showing a driving assistance flow of the driving assistance device according to the first embodiment.

Specifically, the driving assistance device 1 shown in FIG. 1 functionally achieves the driving assistance flow shown in FIG. 10 by causing a processor 1b to execute a computer program stored in a memory 1a. Note that the driving assistance flow is started in response to the on-operation of a power switch provided in the subject vehicle 2 and is ended in response to the off-operation of the same switch. In addition, "S" in the driving assistance flow means each step.

In S101, it is determined whether the driving scene of the subject vehicle 2 is an assistance target scene requiring the driving assistance. The assistance target scene of the first embodiment is preset to each of the passing-through scene and the passing-each-other scene between the obstacles 4A, 4B described above. Therefore, in S101, a driving scene in which the obstacles 4A, 4B on both left and right sides which determine the interval D at a planned passing-through location or a planned passing-each-other location in the surrounding area 4 are recognized by detection under a condition that the vehicle speed of the subject vehicle 2 is low (e.g., 10 km/h or less) is determined as the assistance target scene. At this time, for example, at least one of a side object such as a utility pole, a guardrail, a curbstone, a side wall, other vehicles (including another vehicle coming in the opposite direction in the passing-each-other scene), a pedestrian, a bicycle, or a motorcycle and a roadside edge (including a roadside edge having a side groove) such as a road shoulder or a sidewalk can be recognized as each of the obstacles 4A, 4B. Therefore, S101 is repeatedly executed while a negative determination is made in S101 because at least one of the obstacles 4A, 4B is not recognized. On the other hand, when a positive determination is made in S101 because both the obstacles 4A, 4B are recognized, the process shifts to S102.

In S102, based on the detection information of the surrounding environment recognition sensor 3 and the vehicle-related information on the in-vehicle network 5, the surrounding area map 6 is acquired and stored into the memory 1a. At this time, although the surrounding area map 6 may be acquired based on independent instant information at each processing timing, but may more preferably be acquired based on time series data generated by accumulating the instant information in time series. Here, with the surrounding area 4 including not only stationary objects but also mobile objects, recognition accuracy such as detection accuracy for such mobile objects is higher in the case of the time-series data than in the case of the instant information. Further, in the case of the time-series data, the detection information of the surrounding environment recognition sensor 3 is corrected using the vehicle-related information at each processing timing and then accumulated, so that the same object can be identified for both stationary and mobile objects (i.e., the same obstacle in the present embodiment). Therefore, in the case of using the time series data, the surrounding area map 6 can ensure the time continuity or space continuity by being sequentially updated so that the identification result of the same object is reflected.

In S103 subsequent to such S102, it is determined whether the subject vehicle 2 is travelable in the passing-through scene or the passing-each-other scene determined as the assistance target scene in S101. At this time, it is determined that the subject vehicle 2 is travelable when an interval D (refer to FIGS. 8 and 9), equal to or larger than a threshold Dth where the passing-through or the passing-each-other of the subject vehicle 2 is possible, is predicted to be ensured without coming into contact with or colliding with any of the obstacles 4A, 4B. On the other hand, when the ensured interval D is predicted to be smaller than the threshold Dth, it is determined that the subject vehicle 2 is non-travelable. From these facts, the determination on whether the subject vehicle 2 is travelable is executed based on at least one of the surrounding area map 6 acquired in S102 and stored in the memory 1a, the detection information of the surrounding environment recognition sensor 3, and the vehicle-related information on the in-vehicle network 5. Further, in the first embodiment, for example, a fixed value stored in advance into the memory 1a at the time of factory shipment or the like is given as the threshold Dth to be the determination criterion on whether the subject vehicle is travelable in S103.

When it is determined in S103 that the subject vehicle 2 is travelable, S104 and S105 are sequentially executed. First, in S104, a guide 7 for guiding the subject vehicle 2 in the passing-through scene or the passing-each-other scene is generated based on the surrounding area map 6 as in the surrounding area maps of FIGS. 4 and 5. At this time, the guide 7 is generated so as to indicate a planned trajectory along which the subject vehicle 2 is travelable while ensuring the interval D (refer to FIGS. 8 and 9) in a range requiring the steering assistance in the surrounding area map 6 acquired in S102 and stored in the memory 1a. In the subsequent S105, in accordance with the guide 7 generated in S104, the steering of the subject vehicle 2 by the driver is assisted in the passing-through scene or the passing-each-other scene. At this time, any one of the following three modes is adopted as a method of presenting the guide 7 to the driver (i.e., an output method).

Figure 8:
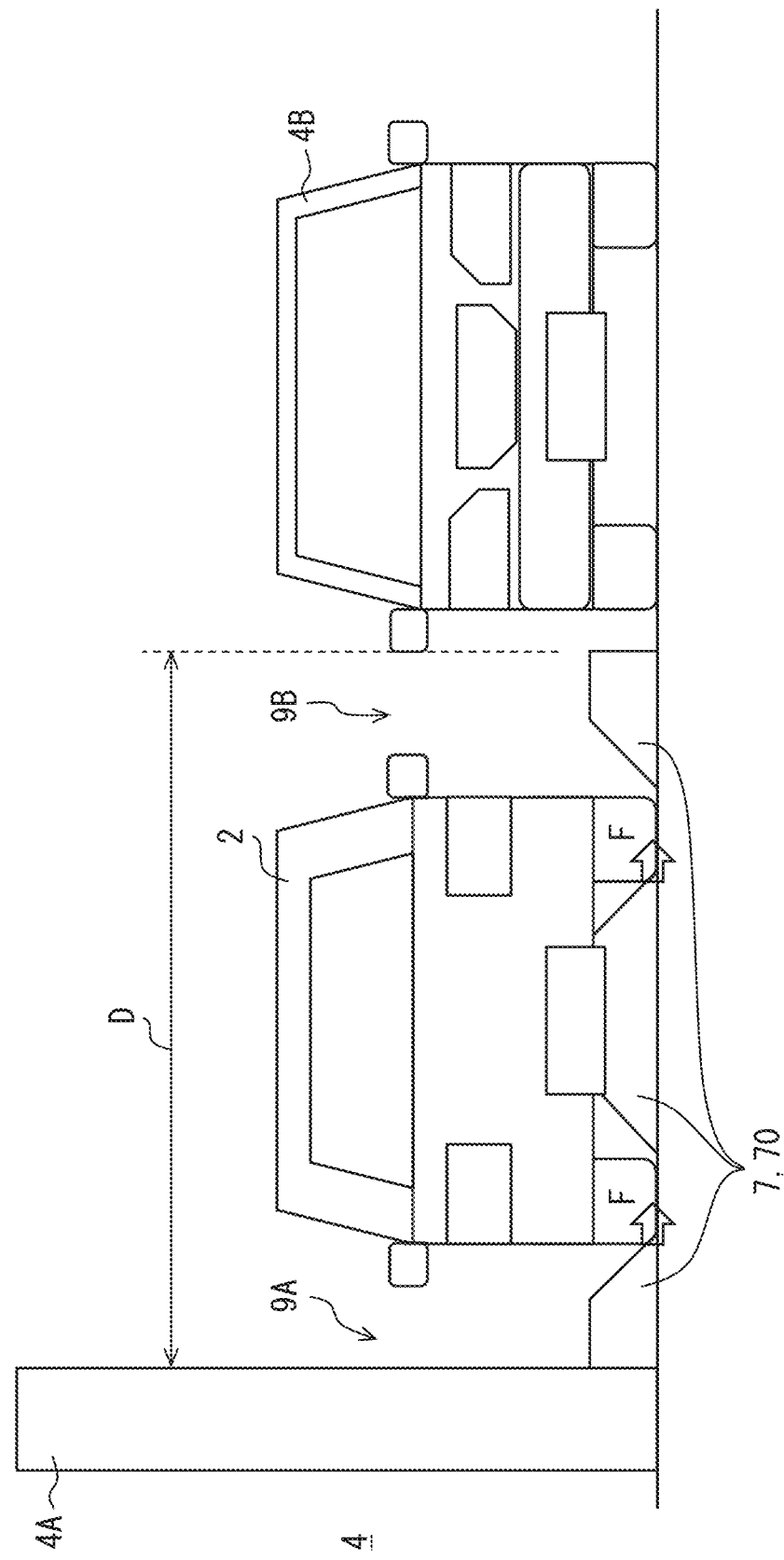
FIG. 8 is a schematic view for explaining the operation of the driving assistance device according to the first embodiment.
Figure 9:
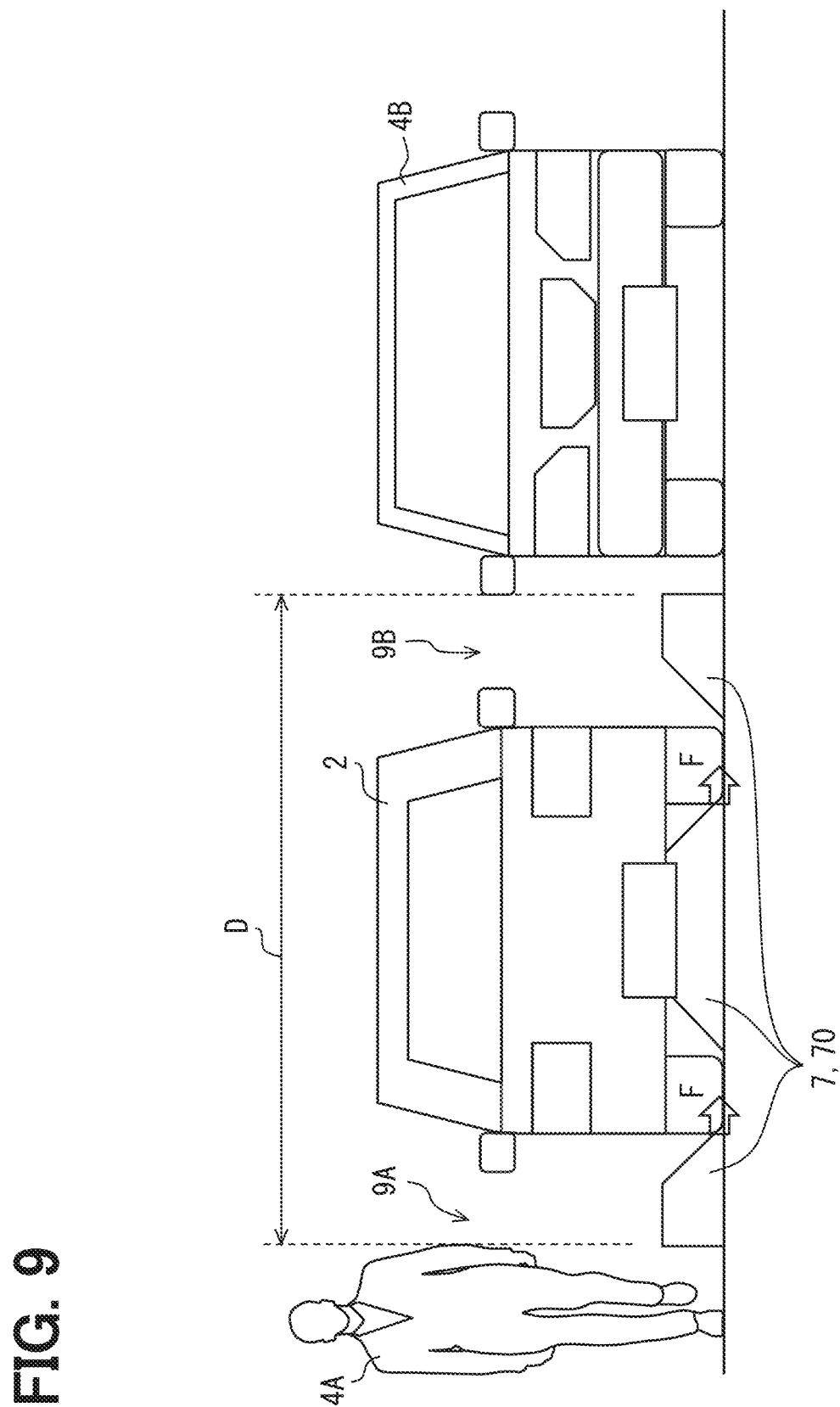
FIG. 9 is a schematic view for explaining the operation of the driving assistance device according to the first embodiment.

In the presentation method according to one mode of the guide 7, as shown in FIGS. 6 to 9, the steering by the driver in the subject vehicle 2 is directly assisted by electronic ruts 70 that function as if those were ruts at the time of traveling on a snowy road. In this presentation method, by the electronic ruts 70 being set along the guide 7 to be a route along which the subject vehicle 2 is to pass from now on, a steering wheel receives a reaction force F as shown in FIGS. 8 and 9. Here, in particular, the reaction force F is given so that the reaction force F increases as the subject vehicle 2 approaches the obstacle 4A or 4B in the surrounding area 4 and that the increasing tendencies which are consistent or different on both left and right sides are fixed. From this fact, the driver receives the reaction force F through the steering wheel when performing steering off the guide 7 and can thus be assisted not to fall into a dangerous situation.

Figure 11:
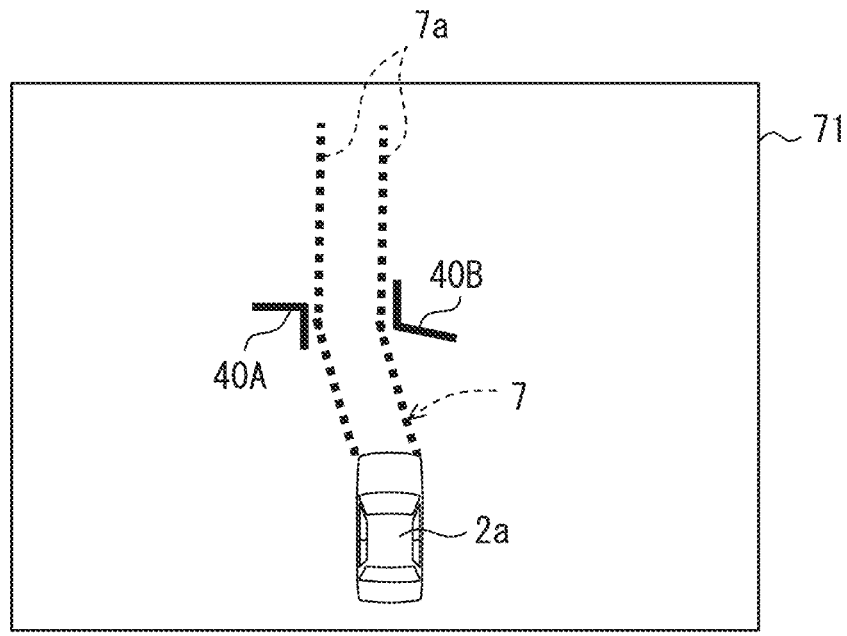
FIG. 11 is a schematic view for explaining the operation of the driving assistance device according to the first embodiment.

In the presentation method according to another mode, as shown in FIG. 11, the image of the guide 7 and the position of the subject vehicle 2 are displayed on a display device 71 such as a meter, whereby the steering by the driver is indirectly assisted so that the subject vehicle 2 follows the guide 7. In this presentation method, while an image 7a imitating the guide 7 that is a route along which the subject vehicle 2 is to pass from now on is displayed, the relative position of an image 2a imitating the subject vehicle 2 and the relative positions of images 40A, 40B imitating the respective obstacles 4A, 4B are displayed. In this way, the driver steers the subject vehicle 2 so as to trace on the guide 7 and can thereby be assisted not to fall into a dangerous situation.

Figure 12:
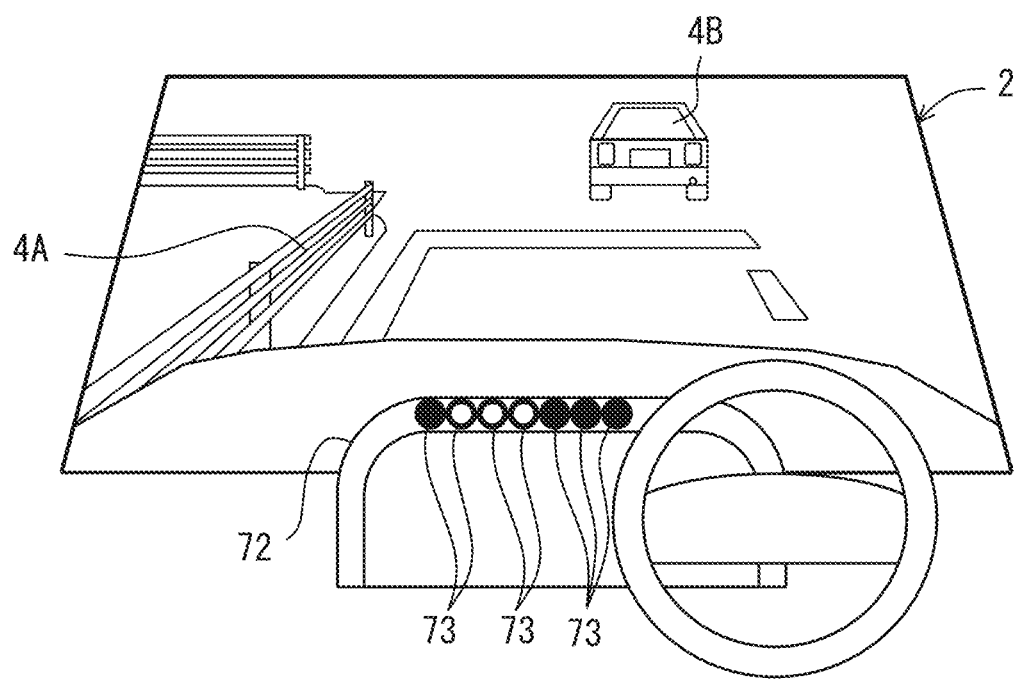
FIG. 12 is a schematic view for explaining the operation of the driving assistance device according to the first embodiment.
Figure 13:
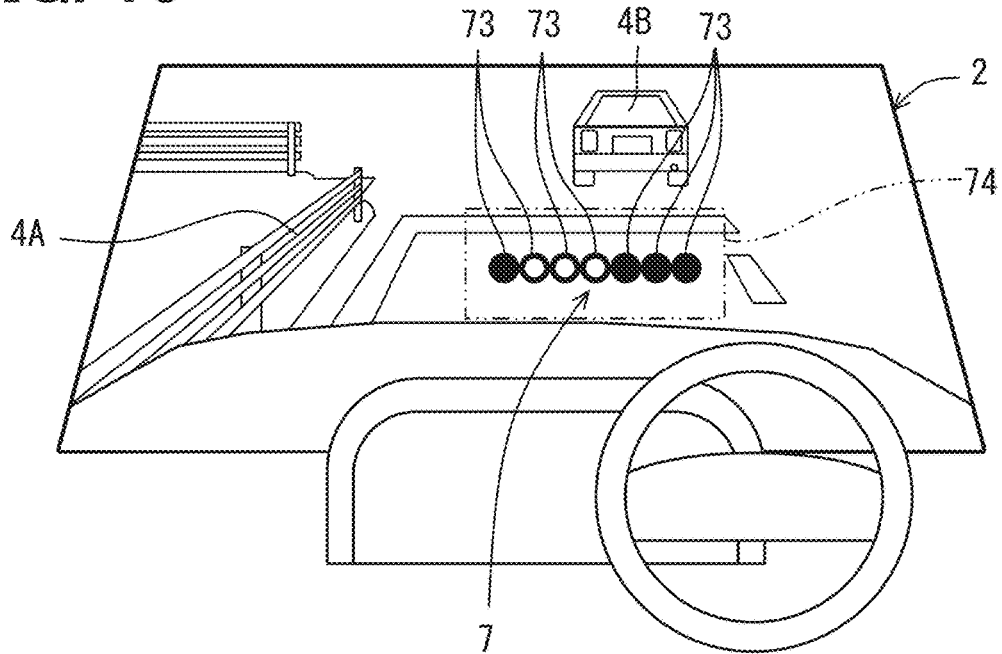
FIG. 13 is a schematic view for explaining the operation of the driving assistance device according to the first embodiment.

The presentation method according to still another mode is to cause a lamp 73 disposed on a meter 72 and displayed as a real image as shown in FIG. 12 or a lamp 73 displayed as a virtual image on a display region 74 of a head-up display (HUD) as shown in FIG. 13 to function as the guide 7.

Specifically, the steering direction of the steering wheel to be operated is instructed by the lighting or blinking pattern of the lamp 73, whereby the steering by the driver is indirectly assisted so that the subject vehicle 2 follows the pattern. In this presentation method, the driver steers the steering wheel in accordance with the lighting or blinking pattern of the lamp 73 to get the subject vehicle 2 to travel along the guide 7 which is the route along which the subject vehicle 2 is to pass from now on and can thereby be assisted not to fall into a dangerous situation.

Note that the presentation method for assisting the steering by the driver in accordance with the guide 7 in S105 is not limited to the three modes described above, and may also be achieved by, for example, audio output or the like in addition to a combination of at least two of the above modes. Further, S105 is continuously executed until the steering assistance is completed in part of the generation range for the guide 7 (i.e., the range requiring the steering assistance).

After the execution of S105 for achieving such steering assistance, S106 is further executed as shown in FIG. 10. In S106, it is determined whether the assistance target scene has ended. At this time, when a negative determination is made in S106 that the assistance target scene is continued, the process returns to S101. On the other hand, when a positive determination is made in S106 that the assistance target scene has ended, the process shifts to S107.

Figure 14:
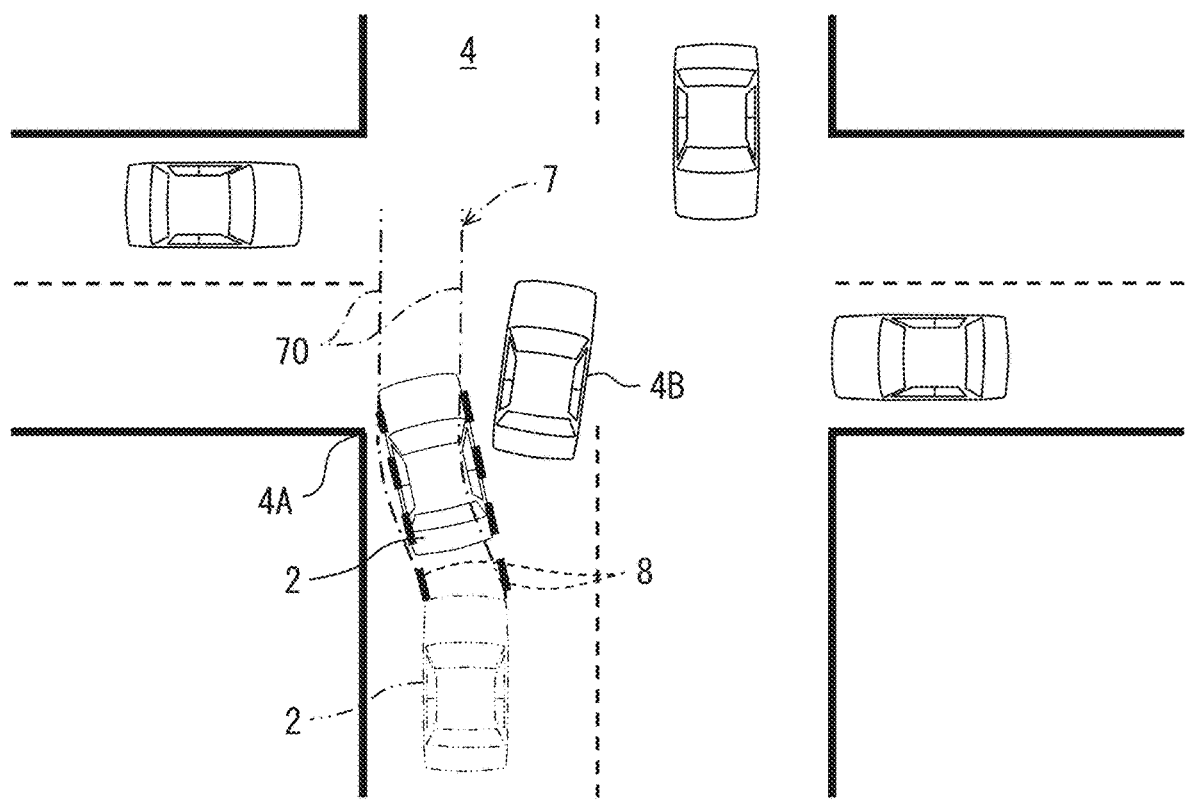
FIG. 14 is a schematic view for explaining the operation of the driving assistance device according to the first embodiment.

In S107, the degree of deviation of an actual trajectory 8 with respect to the guide 7 presented by the steering assistance in S105 is determined. The actuary trajectory 8 is a trajectory along which the subject vehicle 2 has actually passed as shown in FIG. 14 during the steering assistance. At this time, for example, in a case where the maximum or average deviation width of the actual trajectory 8 with respect to the guide 7 is equal to or smaller than the upper limit allowable width, a case where the deviation ratio of the deviation width to the vehicle width is equal to or smaller than the upper limit allowable ratio, or some other case, it is determined that the actual trajectory 8 does not deviate from the guide 7, that is, the degree of deviation is substantially zero, and the process then returns to S101 as shown in FIG. 10. On the other hand, for example, in a case where the maximum or average deviation width of the actual trajectory 8 with respect to the guide 7 exceeds the upper limit allowable width, a case where the deviation ratio of the deviation width to the vehicle width exceeds the upper limit allowable ratio, or some other case, it is determined that the actual trajectory 8 deviates from the guide 7, and the process shifts to S108.

In S108, reference position information 1b is updated in accordance with the degree of deviation between the guide 7 and the actual trajectory 8 confirmed in S107. Here, the reference position information 1b defines the relative position of the guide 7 in the surrounding area map 6 to each of the obstacles 4A, 4B in the passing-through scene or the passing-each-other scene. The reference position information 1b is stored in the memory 1a in a predetermined data format, and is read out from the memory 1a when the guide 7 is generated in the next S104 after the update in S108 of this time. As a result, the relative position of the guide 7 to the obstacles 4A, 4B at the next execution point of S104 is adjusted in the surrounding area map 6 so as to be a position in accordance with the updated reference position information 1b. That is, in the next S104, the guide 7 is generated in accordance with the updated reference position information 1b. Therefore, in S108 of this time, the relative position is learned at which the deviation of the actual trajectory 8 from the guide 7 decreases or substantially disappears from the degree of confirmation in S107, and the reference position information 1b is updated so as to define the learned relative position. After the execution of S108, the process returns to S101.

When it is determined in S103 that the subject vehicle is travelable, S104 to S108 are executed as described above for presenting a situation where the subject vehicle is travelable to the driver. Whereas, in the following, a description will be given of S109 which is executed when it is determined in S103 that the subject vehicle 2 is non-travelable.

In S109, by executing at least one of a subject vehicle stop instruction instructing the subject vehicle 2 to stop and a guide generation stop to stop the generation of the guide 7, a situation where the subject vehicle 2 is non-travelable is presented to the driver so that the subject vehicle 2 does not travel further. This can also assist the driver not to fall into a dangerous situation. After the execution of S109, the process returns to S101.

As described above, in the first embodiment, the functional portion of the driving assistance device 1 which executes S102 corresponds to the "map acquisition unit", the functional portion of the driving assistance device 1 which executes S103 corresponds to the "traveling determination unit", and the functional portion of the driving assistance device 1 which executes S104 corresponds to the "guide generation unit." Further, in the first embodiment, the functional portion of the driving assistance device 1 which executing S105 corresponds to the "steering assistance unit", the functional portion of the driving assistance device 1 which executes S107 and S108 corresponds to the "reference updating unit", and the functional portion of the driving assistance device 1 which executes S109 corresponds to the "stop unit."

According to the first embodiment described so far, it is possible to assist the driver with the traveling and steering of the subject vehicle 2 in the assistance target scene which is each of the passing-through scene and the passing-each-other scene. Specifically, by acquiring the surrounding area map 6 that indicates the object state in the surrounding area 4 of the subject vehicle 2 to define the positional relation between the objects, a region in the surrounding area 4 where the subject vehicle 2 is travelable is recognized with high accuracy. Therefore, whether the subject vehicle 2 is travelable in the assistance target scene can be accurately determined based on the surrounding area map 6. Further, when it is determined that the subject vehicle 2 is travelable, the steering of the subject vehicle 2 by the driver can be accurately assisted by following the guide 7 that is generated based on the surrounding area map 6 as the guide 7 for guiding the subject vehicle 2 in the assistance target scene.

At this time, particularly for a driver who has a feeling of being not good at driving or has an experience of fear, the determination and the operations of the drivers can be assisted by presenting the guide 7 of the route through which the subject vehicle 2 passes from now on. Hence, the feeling of being not good at driving can be eliminated to prevent an accident in advance, or a sense of security can be given to deal with the experience of fear. From the above, according to the first embodiment, it is possible to ensure the safety and security of the driver in the passing-through scene and the passing-each-other scene as the assistance target scenes.

In addition, according to the first embodiment, the relative positions of the obstacles 4A, 4B and the guide 7 to the subject vehicle 2 in the surrounding area map 6 in the assistance target scene are adjusted in accordance with predetermined reference position information 1b. Here, when the reference position information 1b is updated in accordance with the degree of deviation from the guide 7 of the actual trajectory 8 along which the subject vehicle 2 has passed during the steering assistance, the sizes of the spaces 9A, 9B ensured by the subject vehicle 2 between the subject vehicle and the obstacles 4A, 4B, respectively in accordance with the guide 7 as in FIGS. 8 and 9 can be approximated to the size in the actual trajectory 8 on which the sense of the driver has been reflected. It is thus possible to enhance the sense of security given to the driver in the passing-through scene and the passing-each-other scene as the assistance target scenes.

Second Embodiment

The second embodiment is a modification of the first embodiment.

Figure 15:
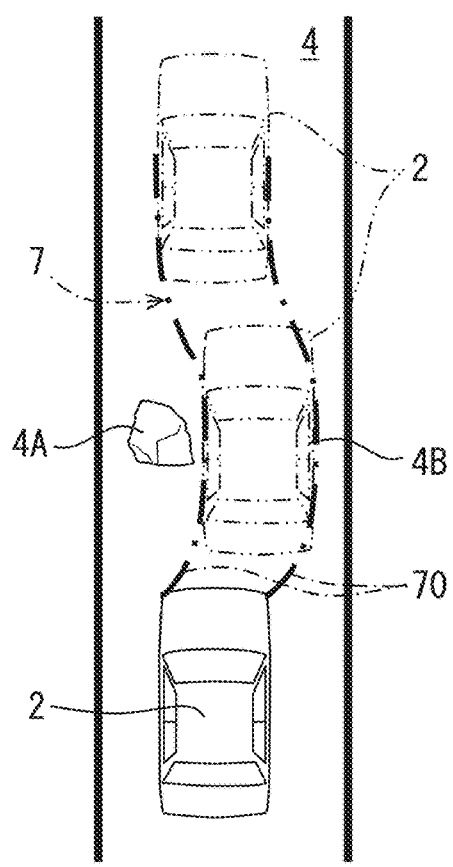
FIG. 15 is a schematic view for explaining the operation of a driving assistance device according to a second embodiment of the present disclosure.

There is a concern that when a fallen object is present on the road as the obstacle 4A as shown in FIG. 15, the driver may be unable to promptly decide whether the subject vehicle 2 can pass through the space beside the fallen object while avoiding the fallen object, or pass each other with another vehicle coming in the opposite direction as the obstacle B while avoiding such a fallen object (not shown). Also, there is a concern that when a parked or stopped vehicle is present on the road as the obstacle 4A as shown in FIG. 16, the driver may be unable to promptly decide whether the subject vehicle 2 can pass through the space beside the parked or stopped vehicle while avoiding the vehicle (not shown), or pass each other with another vehicle coming in the opposite direction as the obstacle B while avoiding the parked or stopped vehicle.

Figure 17:
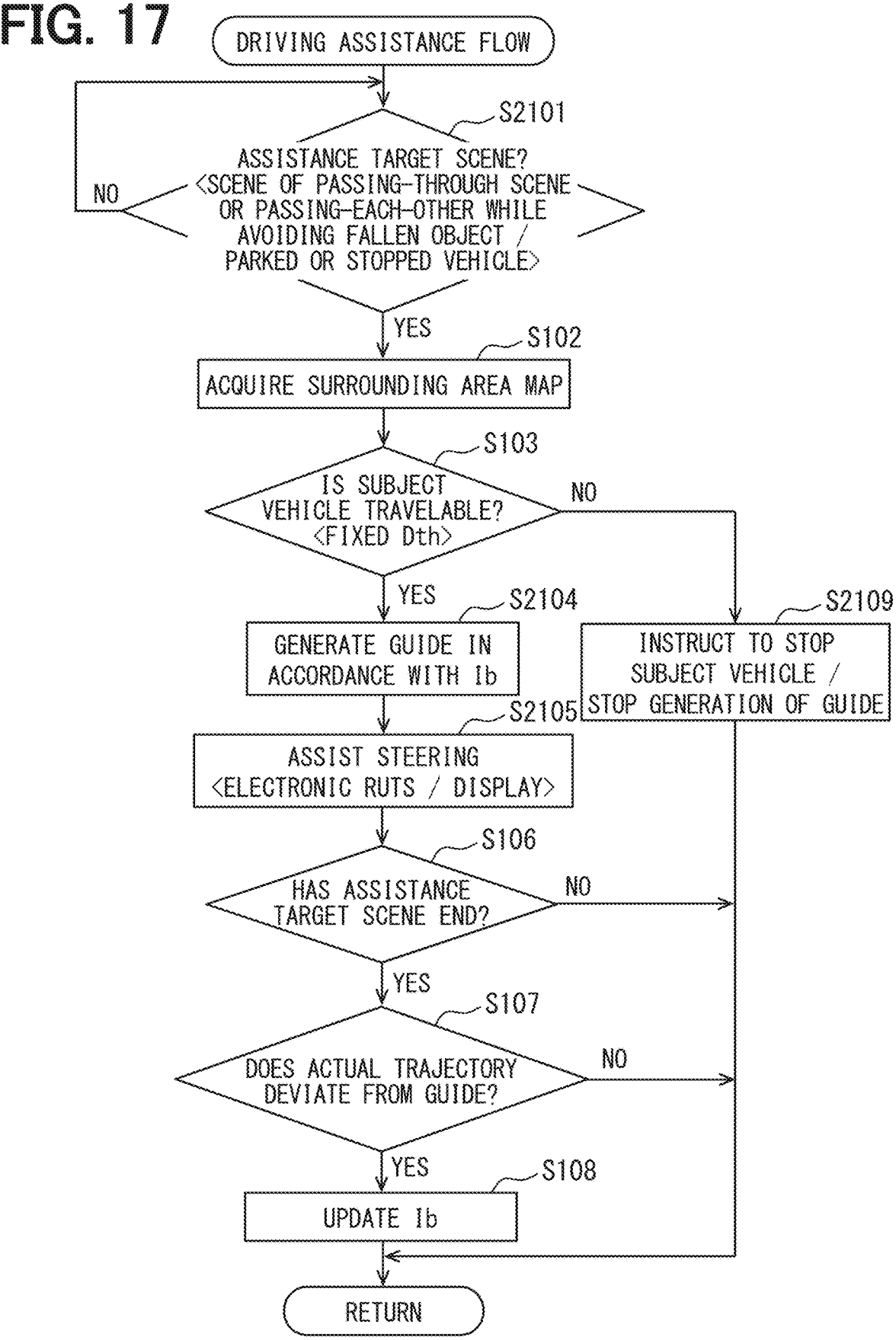
FIG. 17 is a flowchart showing a driving assistance flow of the driving assistance device according to the second embodiment.

Therefore, as shown in FIG. 17, in S2101 replacing S101 of the driving assistance flow according to the second embodiment an assistance target scene is preset for each of the passing-through scene and passing-each-other scene for avoiding the fallen object or the parked or stopped vehicle described above. Therefore, in S2101, a driving scene where the fallen object or the parked or stopped vehicle as the obstacle 4A or 4B in a planned passing-through location or a planned passing-each-other location in the surrounding area 4, especially as the obstacle 4A, are recognized by detection or the like under a condition that the vehicle speed of the subject vehicle 2 is low (e.g., 10 km/h or less) is determined as the assistance target scene. At this time, for example, at least one of a side object such as a utility pole, a guardrail, a curbstone, a side wall, other vehicles (including the other vehicle coming in the opposite direction in the passing-each-other scene), a pedestrian, a bicycle, or a motorcycle and a roadside edge such as a road shoulder or a sidewalk can be recognized as the obstacle 4B.

Figure 16:
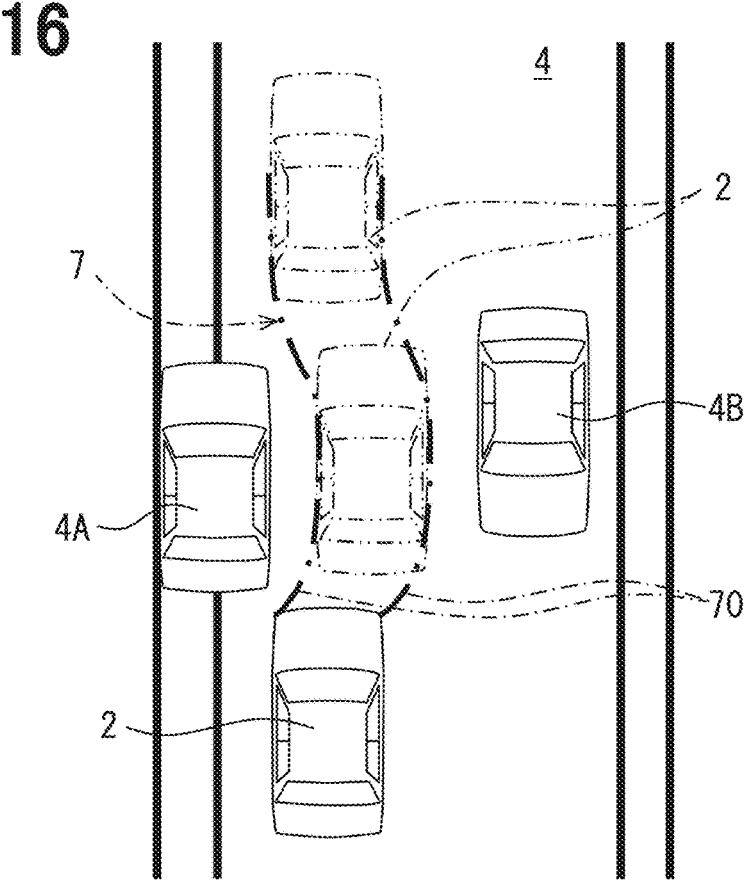
FIG. 16 is a schematic view for explaining the operation of the driving assistance device according to the second embodiment.

In S2104 and S2105 replacing S104 and S105 of the driving assistance flow after the execution of S2101, in the passing-through scene or the passing-each-other scene where it is necessary to avoid the fallen object or the parked or stopped vehicle because the driver is overlooking the object or the vehicle, the generation of the guide 7 and the steering assistance as shown in FIGS. 15 and 16 are executed sequentially. At this time, the generation of the guide 7 and the steering assistance can be achieved based on the surrounding area map 6 so as to avoid the fallen object or the parked or stopped vehicle and safely complete the passing-through or the passing-each-other. Also in S2105, at least one of the electronic ruts 70 and the display according to S105 can be adopted as the method of presenting the guide 7, so that the driver can be assisted not to fall into a dangerous situation.

On the other hand, in S2109 replacing S109 of the driving assistance flow after the execution of S2101, it is taken as impossible to ensure the predicted interval D to be equal to or larger than the threshold Dth that enables the passing-through or the passing-each-other while avoiding the fallen object or the parked or stopped vehicle, and the presentation of the state that the subject vehicle 2 is non-travelable is performed. As a result, since at least one of the subject vehicle stop instruction and the guide generation stop is executed, the driver can be assisted not to fall into a dangerous situation. Note that the driving assistance flow according to the second embodiment is substantially the same as the driving assistance flow according to the first embodiment except for the points described above.

As thus described, in the second embodiment, the functional portion of the driving assistance device 1 which executes S2104 corresponds to the "guide generation unit", the functional portion of the driving assistance device 1 which executes S2105 corresponds to the "steering assistance unit", and the functional portion of the driving assistance device 1 which executes S2109 corresponds to the "stop unit."

According to the second embodiment described so far, it is possible to exhibit the same function and effect as the first embodiment also in a passing-through scene and passing-each-other scene for avoiding a fallen object or a parked or stopped vehicle.

Third Embodiment

The third embodiment is a modification of the first embodiment.

Figure 18:
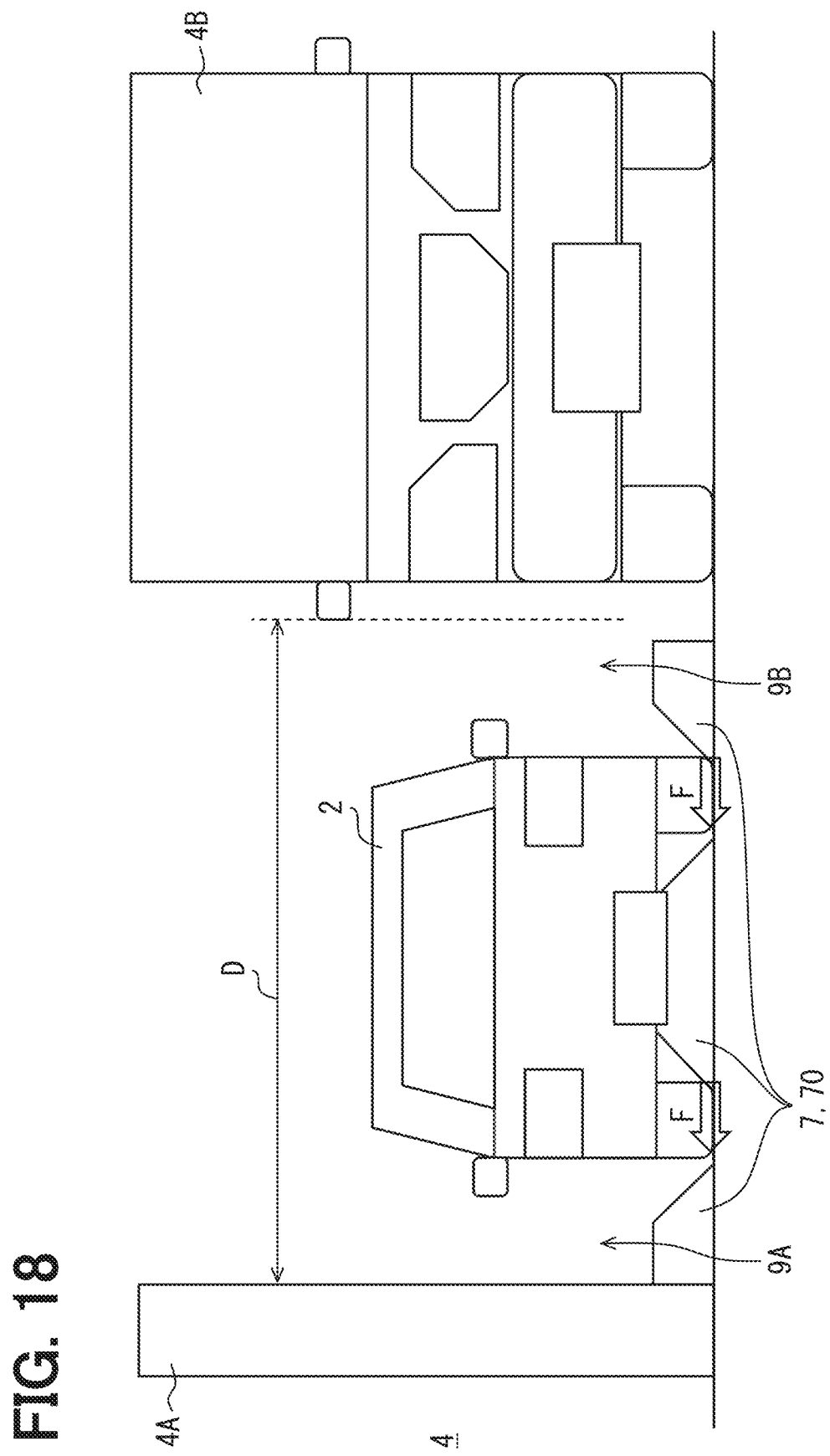
FIG. 18 is a schematic view for explaining the operation of the driving assistance device according to the second embodiment.
Figure 19:
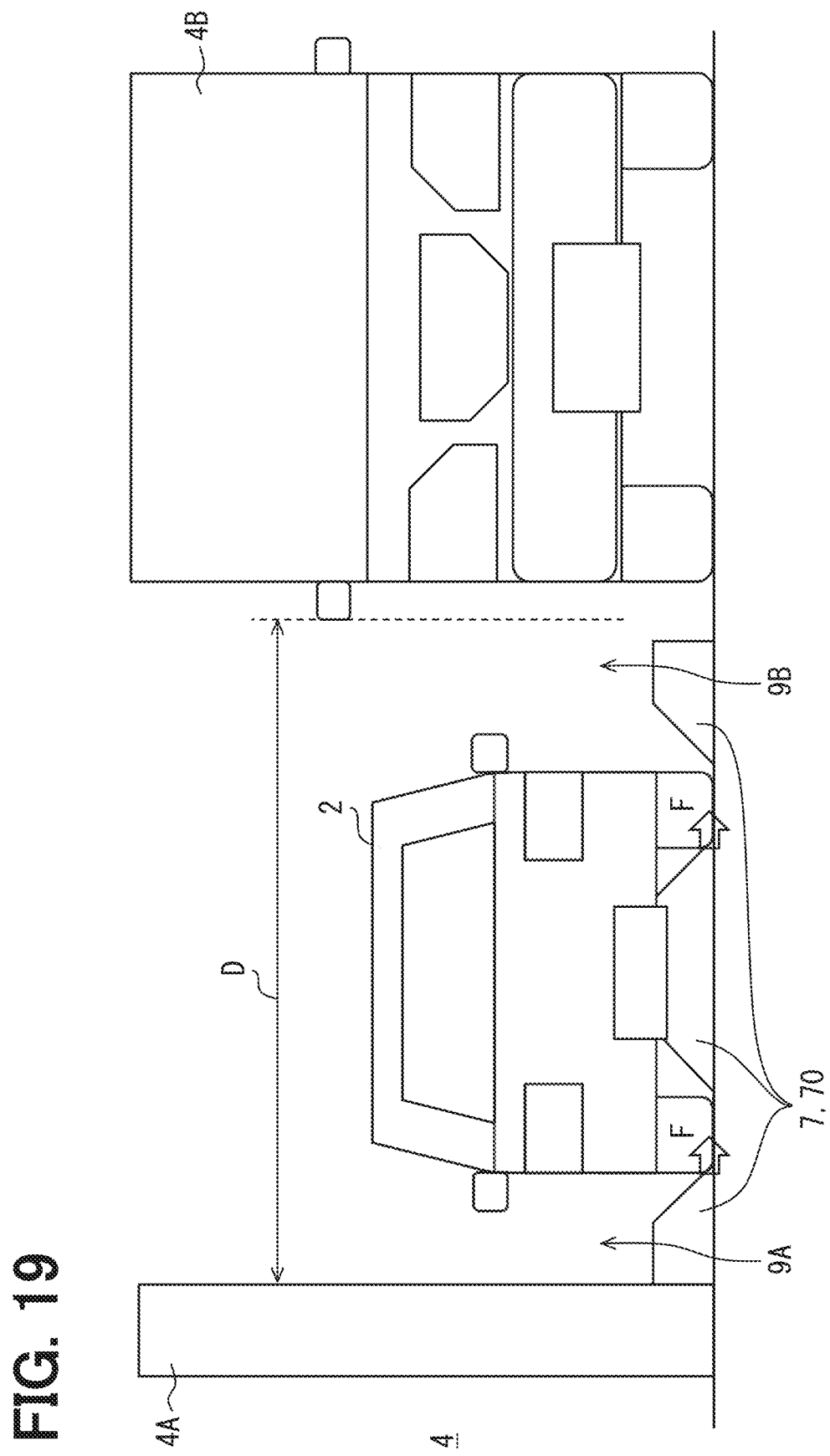
FIG. 19 is a schematic view for explaining the operation of a driving assistance device according to a third embodiment of the present disclosure.

There is a concern that sizes the driver feels necessary as the sizes of spaces 9A, 9B made by the subject vehicle 2 between the subject vehicle 2 and the obstacles 4A, 4B, respectively as shown in FIGS. 18 and 19 may vary depending on attribute indicating characteristics of the obstacles 4A, 4B (hereinafter referred to simply as obstacle attributes) and also on an environment condition outside the subject vehicle 2 (hereinafter referred to simply as external environment state). Here, the attribute is, for example, at least one of the following: types of objects (obstacles 4A, 4B in this case) such as a pedestrian, a bicycle, a motorcycle, an ordinary vehicle, and a large vehicle; and the motion states of the objects, such as relative speeds of stationary objects or mobile objects with respect to the subject vehicle 2. As for the pedestrian, the types as the attributes as above means, for example, the distinction in terms of age or height such as children, old people, and young people. Furthermore, the external environment state is, for example, at least one of a weather condition such as fine weather, cloudy weather, rainy weather, or snowfall, and a time zone such as daytime or nighttime.

Specifically, as shown in FIGS. 18 and 19, there is a tendency for a large number of drivers to ensure the space 9A or 9B to be wide when the obstacle 4A or 4B is a large vehicle such as a truck as compared to when the obstacle 4A or 4B is a small stationary object. Further, there is a tendency for a large number of drivers to ensure the space 9A or 9B to be wide when the obstacle 4A or 4B is a child or an elderly person as a pedestrian as compared to when the obstacle 4A or 4B is a small stationary object. Moreover, there is a tendency for a large number of drivers to ensure the space 9A or 9B to be wide in rainy weather or snowfall as compared to in fine weather. Furthermore, there is a tendency for a large number of drivers to ensure the spaces 9A, 9B to be wide at night as compared to in the daytime.

However, in any situation, all drivers do not necessarily tend to have the same tendency, all drivers do not necessarily desire the same size, and it can be assumed that another tendency may appear by the combination of those situations.

Figure 20:
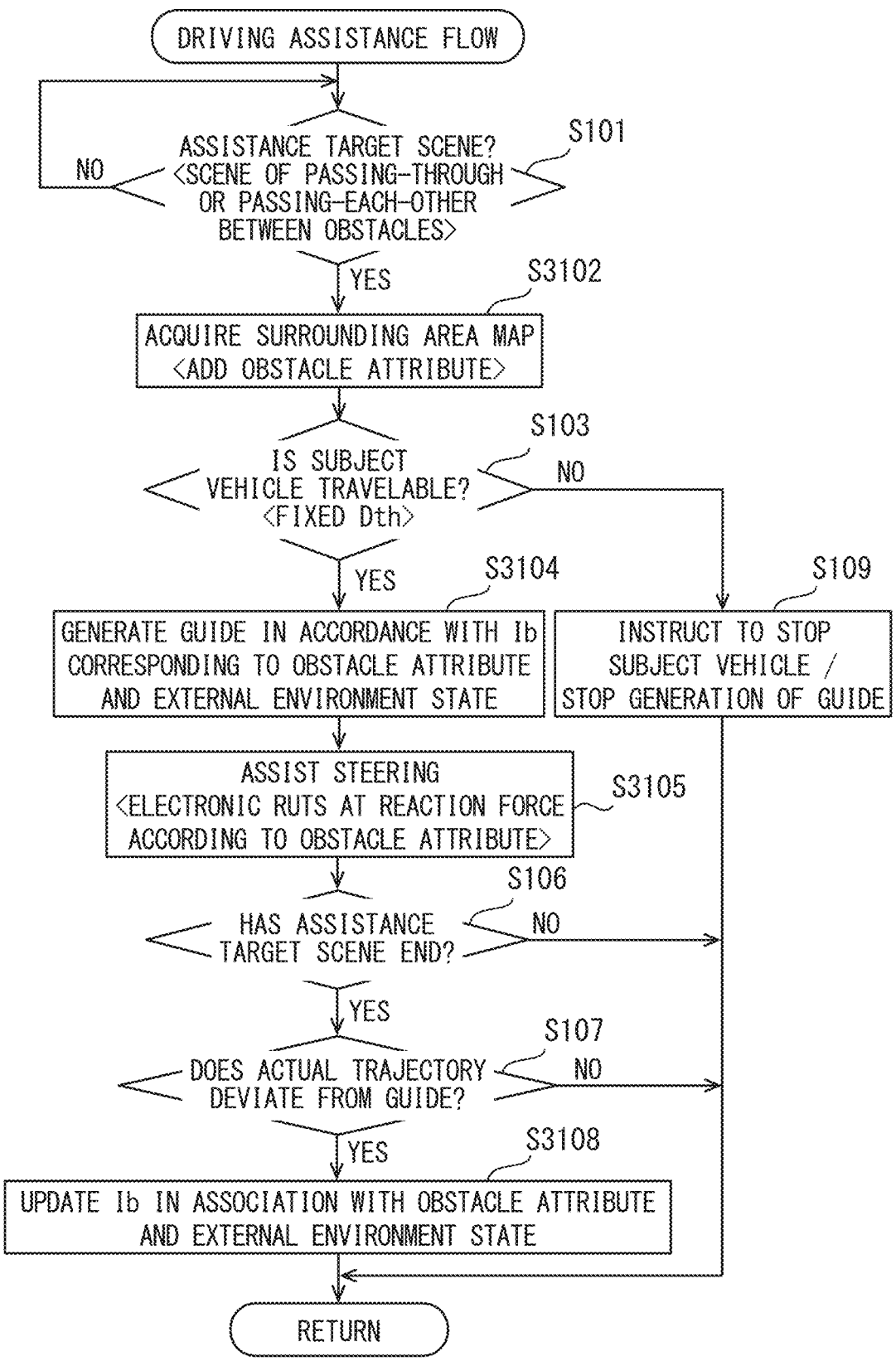
FIG. 20 is a flowchart showing a driving assistance flow of the driving assistance device according to the third embodiment.

Therefore, as shown in FIG. 20, in S3108 replacing S108 of the driving assistance flow according to the third embodiment, the reference position information 1b is updated to information corresponding to the degree of deviation between the guide 7 and the actual trajectory 8 in association with the obstacle attribute and the external environment state in the passing-through scene or the passing-each-other scene where the steering was assisted in the latest S3105 (described in detail later). Here, the obstacle attribute associated with the reference position information 1b is recognized based on the surrounding area map 6 stored in the memory 1a. Further, the external environment state associated with the reference position information 1b is recognized based on at least one of, for example, communication information with the outside, clock information, wiper on-off information, a detection result of illuminance, and the like. Note that the obstacle attribute and the external environment state are defined in advance, and for example, in an initial state such as factory shipment, each set of the obstacle attribute and the external environment state is stored in the memory 1a in association with default information of the reference position information 1b.

Further, in S3102 replacing S102 of the driving assistance flow according to the third embodiment, the attributes of the objects including the obstacles 4A, 4B are added to the surrounding area map 6 in preparation for S3107, described above, after the execution of S3102. At this time, the attribute of the object is stored into the memory 1a in association with the state of the object (i.e., the distance, orientation, position, size, and the like exemplified in the first embodiment) constituting the surrounding area map 6.

Furthermore, in S3104 replacing S104 of the driving assistance flow according to the third embodiment, the reference position information 1b corresponding to the obstacle attribute and the external environment state in the passing-through scene or the passing-each-other scene at the time of execution is read out from the memory 1a. Here, the obstacle attribute corresponding to the reference position information 1b to be read out is recognized based on the surrounding area map 6 stored in the memory 1a. Further, the external environment state corresponding to the reference position information 1b to be read out is recognized based on at least one of, for example, communication information with the outside, clock information, wiper on-off information, and a detection result of illuminance. As described above, the relative position of the guide 7 generated in S3104 to each of the obstacles 4A, 4B is adjusted in accordance with the reference position information 1b updated in the past S3108 in association with the obstacle attribute and the external environment state. That is, in S3104, the guide 7 is generated in accordance with the updated reference position information 1b.

Furthermore, in S3105 replacing S105 of the driving assistance flow according to the third embodiment, the reaction force F to be applied to the steering that is off the guide 7 by the adoption of the electronic ruts 70 is adjusted in accordance with the obstacle attribute in the passing-through scene or the passing-each-other scene at the time of execution. At this time, especially in S3105 of the third embodiment, stronger and weaker weights are variably set for the reaction forces F on both left and right sides where the spaces 9A, 9B are ensured by the subject vehicle 2 following the guide 7 between the subject vehicle 2 and the obstacles 4A, 4B, respectively. Specifically, between the right and left sides of the subject vehicle 2, on a side where the space size becomes wider as shown in FIG. 18 according to the reference position information 1b corresponding to the obstacle attribute, a weight is applied so that the reaction force F is stronger than on the other side where the space size becomes narrower as shown in FIG. 19. This makes it difficult for the driver to operate the steering wheel on the side where the reaction force F is stronger, so that a large space size as shown in FIG. 18 can be ensured on the side of the strong reaction force by the steering assistance in S3105. On the side where the space size is narrower in accordance with the reference position information 1b corresponding to the obstacle attribute, the reaction force F is made weaker as shown in FIG. 19, but the reaction force F is given which can limit the operating range of the steering wheel so as to avoid the contact or collision with the obstacle (4A in the same figure). Note that the driving assistance flow according to the third embodiment is substantially the same as the driving assistance flow according to the first embodiment except for the points described above.

As described above, in the third embodiment, the functional portion of the driving assistance device 1 which executes S3102 corresponds to the "map acquisition unit", and the functional portion of the driving assistance device 1 which executes S3104 corresponds to the "guide generation unit". In the third embodiment, the functional portion of the driving assistance device 1 which executes S3105 corresponds to the "steering assistance unit", and the functional portion of the driving assistance device 1 which executes S107 and S3108 corresponds to the "reference updating unit".

According to the third embodiment described so far, the relative positions of the obstacles 4A, 4B and the guide 7 in the assistance target scene are adjusted according to the updated reference position information 1b associated with the obstacle attribute and the external environment state. According to the above, the sizes of the spaces 9A, 9B ensured by the subject vehicle 2 between the subject vehicle 2 and the obstacles 4A, 4B, respectively in accordance with the guide 7 can be approximated to the size in the actual trajectory 8 on which the sense of the driver that depends also on the obstacle attribute and the external environment state has been reflected. It is thus possible to provide steering assistance that is advantageous for giving a high sense of security to the driver in the passing-through scene and the passing-each-other scene as the assistance target scenes.

Fourth Embodiment

A fourth embodiment is a modification of the third embodiment.

Figure 21:
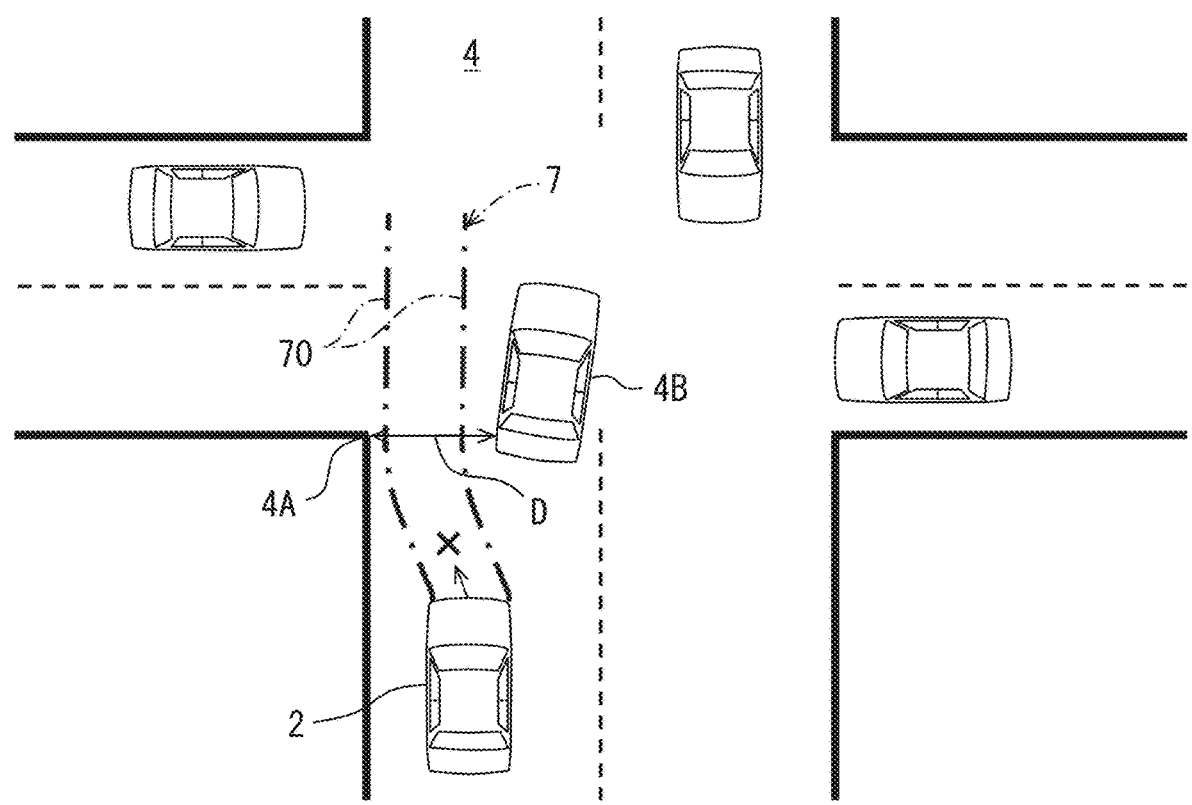
FIG. 21 is a schematic view for explaining the operation of a driving assistance device according to a fourth embodiment of the present disclosure.

As shown in FIG. 21, even when an interval D can be ensured between the obstacles 4A, 4B to be equal to or larger than the threshold Dth physically passable by the subject vehicle 2, the sense of whether to actually allow the passing-through or the passing-each-other varies for each driver, and hence there is a concern that the passing-through or the passing-each-other may be rejected despite the steering assistance.

Figure 22:
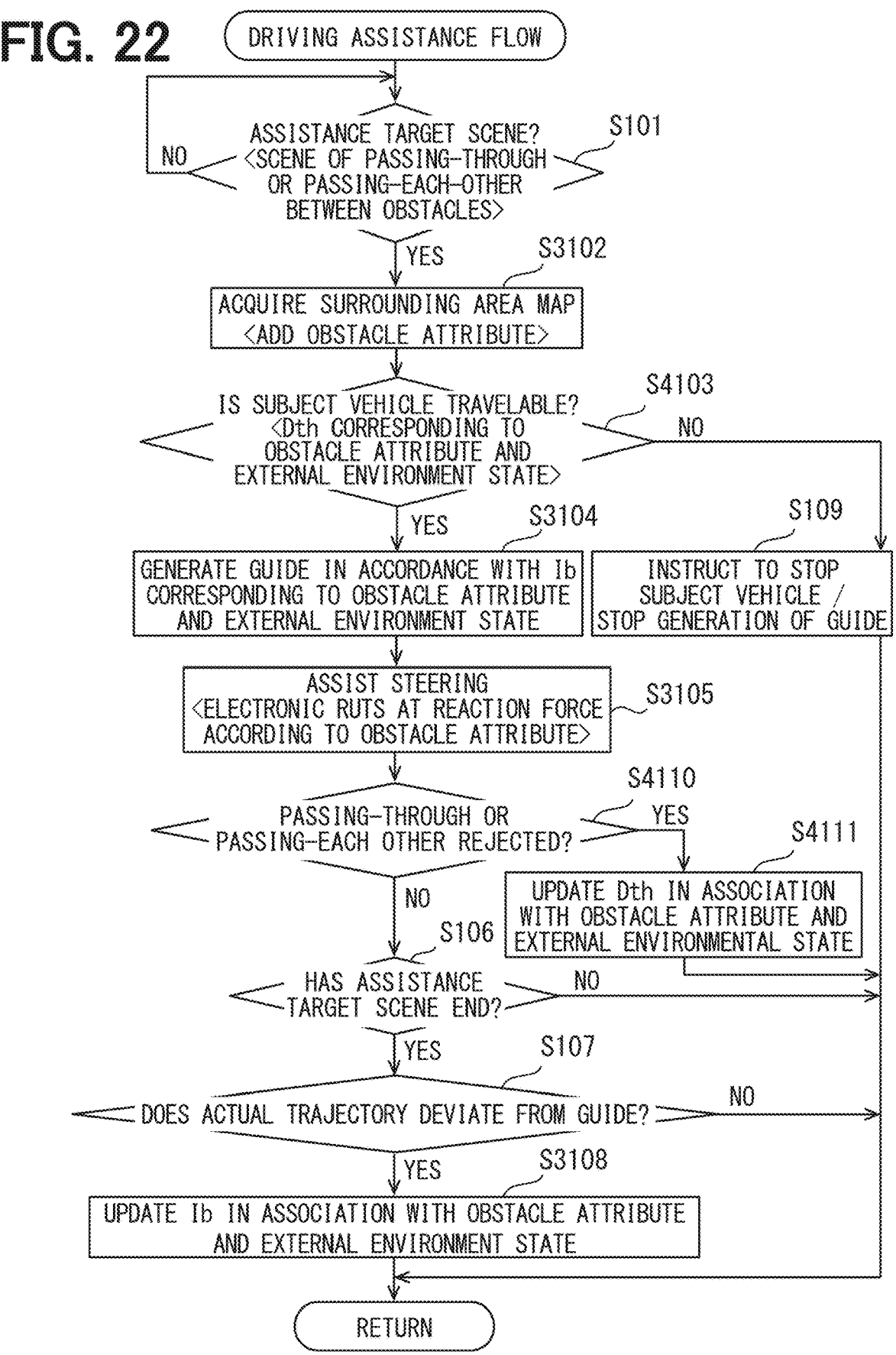
FIG. 22 is a flowchart showing a driving assistance flow of the driving assistance device according to the fourth embodiment.

Therefore, as shown in FIG. 22, in S4110 subsequent to S3105 of the driving assistance flow according to the fourth embodiment, it is determined whether the passing-through or the passing-each-other has been rejected with respect to the steering assistance in S3105. At this time, when a negative determination is made because the start or completion of the passing-through or the passing-each-other is confirmed within a predetermined time from the start of the steering assistance in the last S3105, the process shifts to S106 as in the first embodiment in the driving assistance flow. On the other hand, when a positive determination is made because the start or completion of the passing-through or the passing-each-other is not confirmed within the predetermined time from the start of the steering assistance, the process shifts to S4111 according to the fourth embodiment in the driving assistance flow.

In S4111, the threshold Dth as a determination criterion to be followed in the next S4103 (described in detail later) is updated in association with the obstacle attribute and the external environment state in the passing-through scene or the passing-each-other scene where the steering is assisted in the last S3105. At this time, in S4111 of the fourth embodiment, a threshold Dth larger than the interval D as shown in FIG. 21 in the guide 7 (i.e., the planned trajectory) according to the last S3104 is set. Thus, the threshold Dth of the memory 1a is learned and updated in such a manner that it is more hardly determined that the subject vehicle is travelable in the next S4103. Here, the obstacle attribute associated with the threshold Dth is recognized based on the surrounding area map 6 stored in the memory 1a. Further, the external environment state associated with the threshold Dth is recognized based on at least one of, for example, communication information with the outside, clock information, wiper on/off information, a detection result of illuminance, and the like. In the fourth embodiment as well, in the same manner as the third embodiment, the obstacle attribute and the external environment state are defined in advance, and for example, in an initial state such as factory shipment, each set of the obstacle attribute and the external environment state is stored in the memory 1a in association with a default value of the threshold Dth. After the execution of S4111, the process returns to S101.

In S4103 replacing S103 of the driving assistance flow according to the fourth embodiment, the threshold Dth corresponding to the obstacle attribute and the external environment state in the passing-through scene or the passing-each-other scene at the time of execution is read out from the memory 1a. Here, the obstacle attribute corresponding to the threshold Dth to be read out is recognized based on the surrounding area map 6 stored in the memory 1a. Further, the external environment state corresponding to the threshold Dth to be read out is recognized based on at least one of, for example, communication information with the outside, clock information, wiper on-off information, and a detection result of illuminance. From the above, it is determined whether the subject vehicle 2 is travelable in S4103 based on the threshold Dth updated in association with the obstacle attribute and the external environment state in the past S4111. Note that the driving assistance flow according to the fourth embodiment is substantially the same as the driving assistance flow according to the third embodiment except for the points described above.

As described above, in the fourth embodiment, the functional portion of the driving assistance device 1 which executes S4103 corresponds to the "traveling determination unit", and the functional portion of the driving assistance device 1 which executes S107, S3108, S4110, and S4111 corresponds to the "reference updating unit."

According to the fourth embodiment described so far, the threshold Dth to be the determination criterion on whether the subject vehicle is travelable in the assistance target scene is updated to in such a manner that it is more hardly determined that the subject vehicle is travelable when the passing-through or the passing-each-other is rejected for the steering assistance. According to the above, the threshold Dth, which is the determination criterion on whether the subject vehicle is travelable for allowing the passing-through or the passing-each-other, can be approximated to the sense of the driver. It is thus possible to further enhance the sense of security given to the driver in the passing-through scene and the passing-each-other scene as the assistance target scenes.

Further, the threshold Dth according to the fourth embodiment is updated in association with the obstacle attribute and the external environment state when the passing-through or the passing-each-other is rejected for the steering assistance. According to the above, the threshold Dth, which is the determination criterion on whether the subject vehicle is travelable for allowing the passing-through or the passing-each-other, can be approximated to the sense of the driver that depends also on the obstacle attribute and the external environment state. It is thus possible to provide steering assistance that is advantageous in giving a particularly high sense of security to the driver in the passing-through scene and the passing-each-other scene as the assistance target scenes.

Other Embodiments

Although the plurality of embodiments have been described above, the present disclosure is not to be construed as being limited to only those embodiments, and is applicable to various embodiments and combinations within a scope not departing from the gist of the present disclosure.

An assistance target scene in S2101 of a driving assistance flow according to a first modification may be added to the assistance target scene in S101 (first, third, and fourth embodiments) or substituted for the assistance target scene in S101 (third and fourth embodiments). In a driving assistance flow according to a second modification, one of the passing-through scene and the passing-each-other scene may be removed from the assistance target scene determined in S101 and S2101.

In a driving assistance flow according to a third modification, one of the obstacle attribute and the external environment state may be removed from the target associated with the reference position information 1b in S3108. In this case, in S3104, the reference position information 1b corresponding to the other of the obstacle attribute and the external environment state is read out from the memory 1a and used to adjust the relative positions of the obstacles 4A, 4B and the guide 7 in the surrounding area map 6.

In S3105 of a driving assistance flow according to a fourth modification, the weights of the reaction forces F on both left and right sides may be set so as to make the reaction force F stronger on the side where the space size becomes wider according to the reference position information 1b fixed in advance in accordance with the obstacle attribute. In S105 and S2105 of a driving assistance flow according to a fifth modification, when the electronic ruts 70 are adopted, the weight setting of the reaction force F according to S3105 may be performed. However, in this case, the weights of the reaction forces F on both left and right sides are good to be set so as to make the reaction force F stronger on the side where the space size becomes wider according to the reference position information 1b fixed in advance in accordance with the obstacle attribute. As a specific example of these fourth and fifth modifications, for example, the weight or the like that makes the reaction force F stronger is applied on the side closer to a specific obstacle such as a pedestrian or a mobile object so that the space 9A or 9B is ensured to be wide on the side closer to the specific obstacle.

In S3105 of a driving assistance flow according to a sixth modification, electronic ruts 70 that provide the reaction force F, the increasing tendency of which is fixed according to S105 and S2105, may be adopted as the method of presenting the guide 7. In this case, at least one of the displays according to S105 and S2105 may also be adopted as the method of presenting the guide 7 in S3105. In S3105 of a driving assistance flow according to a seventh modification, at least one of the displays according to S105 and S2105 as the presentation method of the guide 7 may be adopted by being added to or substituted for the electronic ruts 70 that cause the reaction force F to have a variable weight.

In a driving assistance flow according to an eighth modification, the threshold Dth variably input by the driver may be used as the determination criterion on whether the subject vehicle is travelable in S103. In a driving assistance flow according to a ninth modification, one of the obstacle attribute and the external environment state may be removed from a target associated with the threshold Dth in S4111. In this case, in S4103, the threshold Dth corresponding to the other of the obstacle attribute and the external environment state is read out from the memory 1a and used to determine whether the subject vehicle is travelable.

In a driving assistance flow according to a tenth modification, the order of S103/S4103 and S104/S2104/S3104 may be switched. In this case, S105, S2105, and S3105 are executed when determining that the subject vehicle is travelable in S103 and S4103. In an eleventh modification, the driving assistance flow may be changed to return to S104, S2104, and S3104 from the negative determination in S106. In this case, in S104, S2104, and S3104 after the return from the negative determination in S106, the guide 7 is good to be updated in accordance with the actual position of the subject vehicle 2 that has moved with the steering assistance.

Although the lidar, the camera, and the radar have been illustrated as the surrounding environment recognition sensor 3 in the above first embodiment, for example, a sonar or the like may be added to the surrounding environment recognition sensor 3 of the twelfth modification. This is because, under a situation where the subject vehicle 2 is close to a detection target, when the end of the detection target on the side close to the subject vehicle 2 is out of the detection range of the single surrounding environment recognition sensor 3 as illustrated above, the use of an additional sonar or the like makes it effective to warn the driver so that the subject vehicle 2 does not come into contact with or collide with the detection target.

Figure 23:
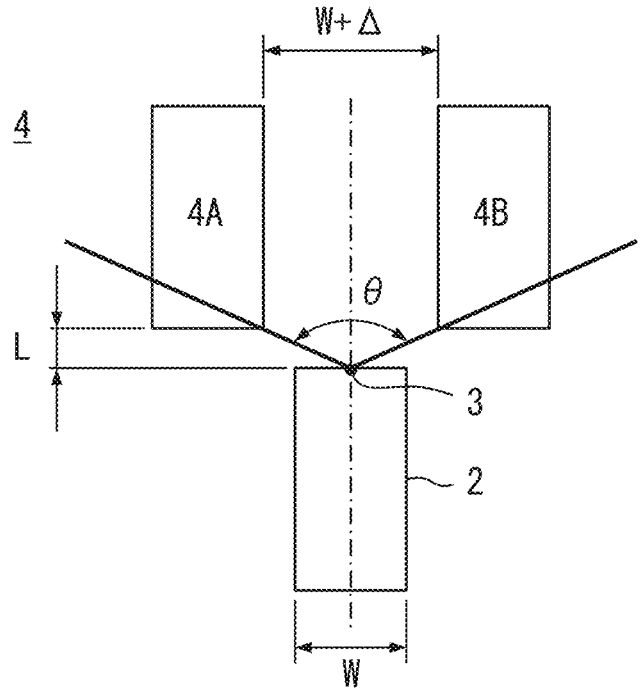
FIG. 23 is a schematic view for explaining a surrounding environment recognition sensor of a modification of the present disclosure.

Specifically, as shown in FIG. 23, there is a limit (the case of $0°<\theta<180°$ in this figure) in a viewing angle θ which defines the detection range of the surrounding environment recognition sensor 3. Hence, there is a concern that when the subject vehicle 2 approaches the obstacles 4A, 4B of the detection target within a distance L in the surrounding area 4, it may become impossible to detect the entire obstacles 4A, 4B. Here, the distance L is a calculation formula $L=[(W+\Delta)/2]/[\tan(\theta/2)]$ using a vehicle width W of the subject vehicle 2, its margin width Δ, and the viewing angle θ of the surrounding environment recognition sensor 3. Therefore, when the subject vehicle 2 approaches the obstacles 4A, 4B within the distance L which can be estimated in advance from the calculation formula, it is effective to make up for the impossibility of detection with the sonar or the like according to the twelfth modification.

Figure 24:
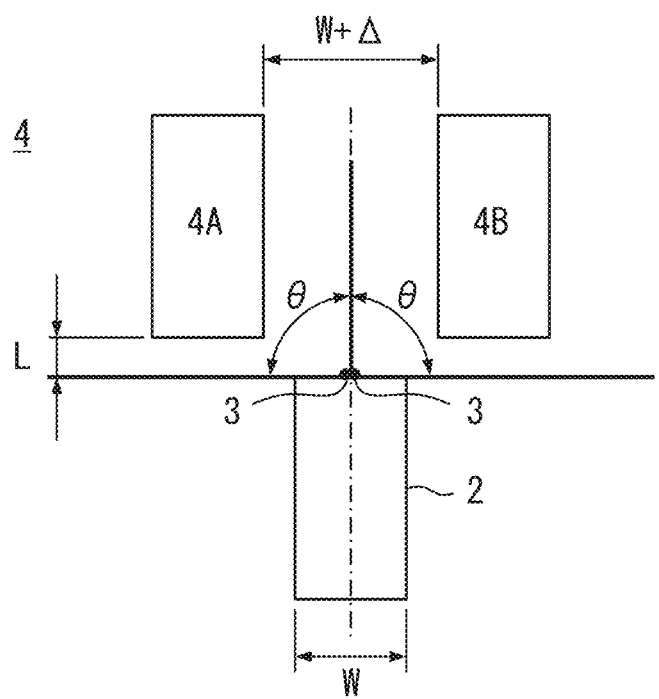
FIG. 24 is a schematic view for explaining a surrounding environment recognition sensor of a modification.
Figure 25:
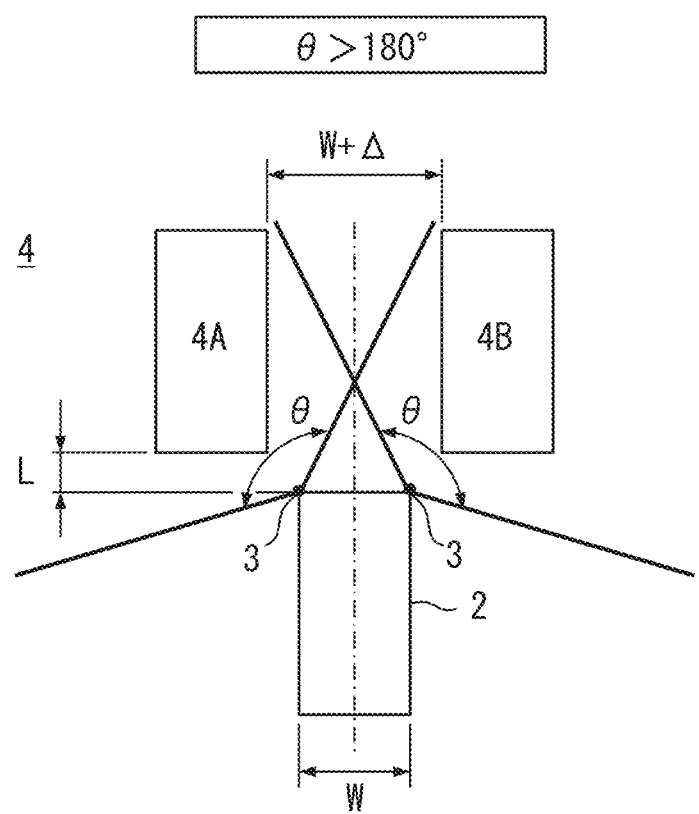
FIG. 25 is a schematic view for explaining a surrounding environment recognition sensor of a modification.

Further, in a thirteenth modification replacing the twelfth modification, a plurality of surrounding environment recognition sensors 3 are arranged in parallel in an adjacent state shown in FIG. 24 and set so that the total of the respective viewing angles θ is 180°, whereby the entire obstacles 4A, 4B can be detected even within the distance L from the subject vehicle 2. Alternatively, in a fourteenth modification replacing the twelfth modification, a plurality of surrounding environment recognition sensors 3 are arranged in parallel in a separated state shown in FIG. 25 and set so that the total of the respective viewing angles θ exceeds 180°, whereby the entire obstacles 4A, 4B can be detected even within the distance L from the subject vehicle 2.

The flowchart described in the present disclosure or the process of the flowchart is configured of a plurality of units (also referred to as steps), and each unit is expressed as S101, for example. Each unit can be divided into a plurality of subunits, while a plurality of units can be combined into one unit. Further, each unit configured in this way can be referred to as a circuit, a device, a module, or means.

Moreover, each of the plurality of units or the combination thereof described above can be achieved, with or without a function of an associated device, not only as (i) a unit of software combined with a hardware unit (e.g., computer), but also as (ii) a hardware unit (e.g., integrated circuit, wired logic circuit). The hardware unit can also be configured inside the microcomputer.

Although the present disclosure has been described in accordance with the embodiments, it is understood that the present disclosure is not limited to the embodiments and structures. The present disclosure encompasses various modifications and variations within an equivalent scope. In addition, various combinations and forms, as well as other combinations and forms including only one element, more than that, or less than that, are also within the scope and idea of the present disclosure.

What is claimed is:

1. A driving assistance device configured to assist driving of a driver in a subject vehicle, the driving assistance device comprising:
   a map acquisition unit configured to acquire a surrounding area map that indicates an object state in a surrounding area of the subject vehicle to define a positional relation between objects;
   a traveling determination unit configured to determine, based on the surrounding area map acquired by the map acquisition unit, whether the subject vehicle is travelable in an assistance target scene that is at least one of a passing-through scene and a passing-each-other scene;
   a guide generation unit configured to generate a guide that guides the subject vehicle in the assistance target scene based on the surrounding area map acquired by the map acquisition unit and configured to adjust relative positions of an obstacle to the subject vehicle in the assistance target scene and the guide in the surrounding area map in accordance a reference position information;
   a steering assistance unit configured to perform a steering assistance to assist steering of the subject vehicle by the driver in accordance with the guide generated by the guide generation unit when the traveling determination unit determines that the subject vehicle is travelable; and
   a reference updating unit configured to update the reference position information in accordance with a degree of deviation between the guide generated by the guide generation unit and an actual trajectory along which the subject vehicle passes during the steering assistance by the steering assistance unit.

2. The driving assistance device according to claim 1, wherein
the guide generation unit is configured to adjust the relative positions of the obstacle and the guide in accordance with the reference position information corresponding to an attribute of the obstacle in the assistance target scene, and
the reference updating unit is configured to update the reference position information in association with the attribute of the obstacle in the assistance target scene.

3. The driving assistance device according to claim 2, wherein
the steering assistance unit is configured to adjust a reaction force to be applied to steering that deviates from the guide in accordance with the reference position information corresponding to the attribute of the obstacle in the assistance target scene.

4. The driving assistance device according to claim 1, wherein
the steering assistance unit is configured to adjust a reaction force to be applied to steering that deviates from the guide in accordance with an attribute of the obstacle in the assistance target scene.

5. The driving assistance device according to claim 1, wherein
the guide generation unit is configured to adjust the relative positions of the obstacle and the guide in accordance with the reference position information corresponding to an external environment state of the subject vehicle in the assistance target scene, and
the reference updating unit is configured to update the reference position information in association with the external environment state of the subject vehicle in the assistance target scene.

6. The driving assistance device according to claim 1, wherein
the traveling determination unit is configured to receive a determination criterion on whether the subject vehicle is travelable, and
the reference updating unit is configured to update the determination criterion in such a manner that the traveling determination unit more hardly determines that the subject vehicle is travelable when a passing-through or a passing-each-other is rejected for the steering assistance by the steering assistance unit.

7. The driving assistance device according to claim 6, wherein
the traveling determination unit is configured to receive the determination criterion corresponding to an attribute of the obstacle in the assistance target scene, and
the reference updating unit is configured to update the determination criterion in the traveling determination unit in association with the attribute of the obstacle in the assistance target scene.

8. The driving assistance device according to claim 6, wherein
the traveling determination unit is configured to receive the determination criterion corresponding to an external environment state of the subject vehicle in the assistance target scene, and
the reference updating unit is configured to update the determination criterion in the traveling determination unit in association with the external environment state of the subject vehicle in the assistance target scene.

9. The driving assistance device according to claim 1, further comprising
a stop unit configured to execute at least one of a subject vehicle stopping instruction for instructing a stop of the subject vehicle and a guide generation stop for stopping a generation of the guide when the traveling determination unit determines that the subject vehicle is not travelable.

10. A driving assistance device configured to assist driving of a driver in a subject vehicle, the driving assistance device comprising:
a processor; and
a memory storing a program that causes the processor to:
acquire a surrounding area map that indicates an object state in a surrounding area of the subject vehicle to define a positional relation between objects;
determine, based on the surrounding area map, whether the subject vehicle is travelable in an assistance target scene that is at least one of a passing-through scene and a passing-each-other scene;
generate a guide that guides the subject vehicle in the assistance target scene based on the surrounding area map and adjust relative positions of an obstacle to the subject vehicle in the assistance target scene and the guide in the surrounding area map in accordance a reference position information;
perform a steering assistance to assist steering of the subject vehicle by the driver in accordance with the guide when determines that the subject vehicle is travelable; and
update the reference position information in accordance with a degree of deviation between the guide and an actual trajectory along which the subject vehicle passes during the steering assistance.

* * * * *